US012678861B2

(12) United States Patent
Chiang et al.

(10) Patent No.: US 12,678,861 B2
(45) Date of Patent: Jul. 14, 2026

(54) THREE-DIMENSIONAL PRINTING

(71) Applicants:Peridot Print LLC, Palo Alto, CA (US); Nanyang Technological University, Singapore (SG)

(72) Inventors: Po-Ju Chiang, Singapore (SG); Karl Davidson, Singapore (SG); Matteo Seita, Singapore (SG); Kristopher J. Erickson, Palo Alto, CA (US)

(73) Assignees: PERIDOT PRINT LLC, Palo Alto, CA (US); Nanyang Technological University, Singapore (SG)

( * ) Notice: Subject to any disclaimer, the term of this patent is extended or adjusted under 35 U.S.C. 154(b) by 0 days.

(21) Appl. No.: 18/833,830

(22) PCT Filed: Jan. 28, 2022

(86) PCT No.: PCT/US2022/014331
§ 371 (c)(1),
(2) Date: Jul. 26, 2024

(87) PCT Pub. No.: WO2023/146533
PCT Pub. Date: Aug. 3, 2023

(65) Prior Publication Data
US 2025/0170650 A1 May 29, 2025

(51) Int. Cl.
*B33Y 10/00* (2015.01)
*B22F 10/14* (2021.01)
(Continued)

(52) U.S. Cl.
CPC .............. *B22F 10/38* (2021.01); *B22F 10/14* (2021.01); *B22F 10/50* (2021.01); *B33Y 10/00* (2014.12);
(Continued)

(58) Field of Classification Search
None
See application file for complete search history.

(56) References Cited

U.S. PATENT DOCUMENTS

| | | | |
|---|---|---|---|
| 2016/0214176 | A1 | 7/2016 | Bruck et al. |
| 2018/0193908 | A1 | 7/2018 | Takashita et al. |

(Continued)

FOREIGN PATENT DOCUMENTS

| | | | |
|---|---|---|---|
| JP | 2016-183390 A | | 10/2016 |
| KR | 10-2020-0084437 A | | 7/2020 |

(Continued)

OTHER PUBLICATIONS

Machine translation of WO 2017162480 A1 via the EPO, translated Sep. 23, 2025 (Year: 2017).*

*Primary Examiner* — Elizabeth Collister
(74) *Attorney, Agent, or Firm* — Michael Dryja

(57) ABSTRACT

In an example method for generating a site-specific alloyed section of a three-dimensional (3D) object during three-dimensional printing, individual layers of a metal-based build material are patterned, based on a digital 3D object model of the 3D object, with a binder agent to form an intermediate structure. A first portion of at least one of the individual layers is patterned, based on the digital 3D object model, with an alloying agent to form a pattern of the site-specific alloyed section. A second portion of at least one of the individual layers is patterned, based on the digital 3D object model, with a diffusion barrier agent to form a perimeter pattern at an edge of at least a portion of the site-specific alloyed section. The intermediate structure is exposed to a heat treatment to form the 3D object.

14 Claims, 8 Drawing Sheets

(51) Int. Cl.

|  |  |
|---|---|
| *B22F 10/38* | (2021.01) |
| *B22F 10/50* | (2021.01) |
| *B33Y 40/20* | (2020.01) |
| *B33Y 80/00* | (2015.01) |

(52) U.S. Cl.
CPC .............. *B33Y 40/20* (2020.01); *B33Y 80/00* (2014.12); *B22F 2301/35* (2013.01); *B22F 2998/10* (2013.01)

(56) References Cited

U.S. PATENT DOCUMENTS

| 2018/0369917 A1 | 12/2018 | Mottin et al. |
| 2019/0030608 A1 | 1/2019 | Ott et al. |
| 2019/0192383 A1 | 6/2019 | Schiller et al. |
| 2019/0388968 A1 | 12/2019 | Narayanan |
| 2022/0274163 A1* | 9/2022 | Jangam ................... B22F 10/14 |

FOREIGN PATENT DOCUMENTS

| MX | 2019002238 A | 6/2019 | |
| WO | WO-2017162480 A1 * | 9/2017 | .............. B22F 12/57 |
| WO | 2019/021291 A1 | 1/2019 | |

* cited by examiner

Silicon Rich Steel Build Material
Fig. 10A
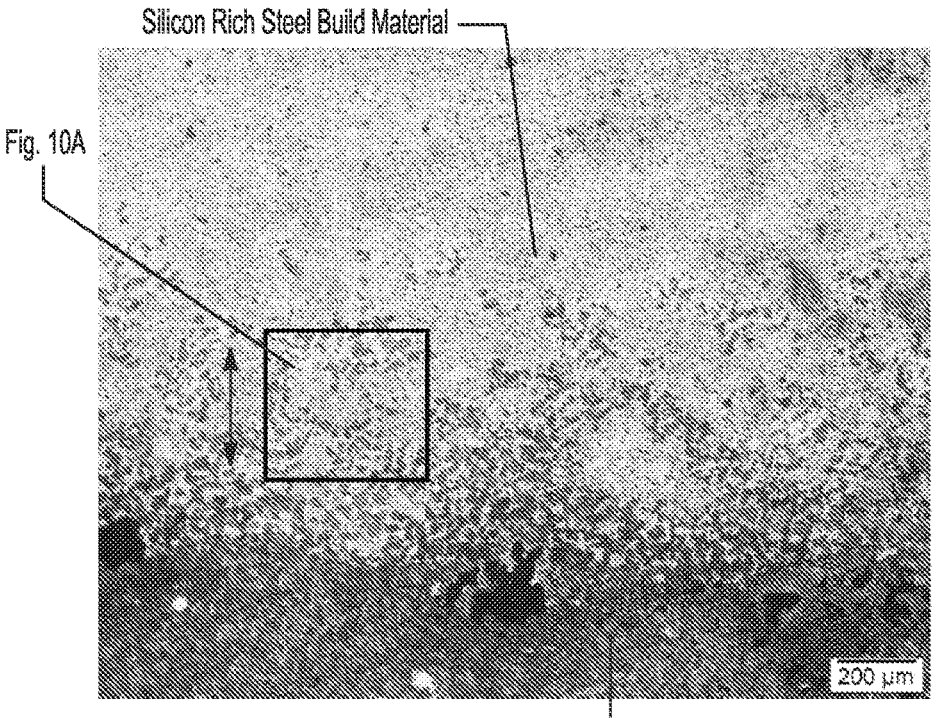
200 μm
Carbon Rich Steel Build Material
*Fig-9A*
Steel Build Material
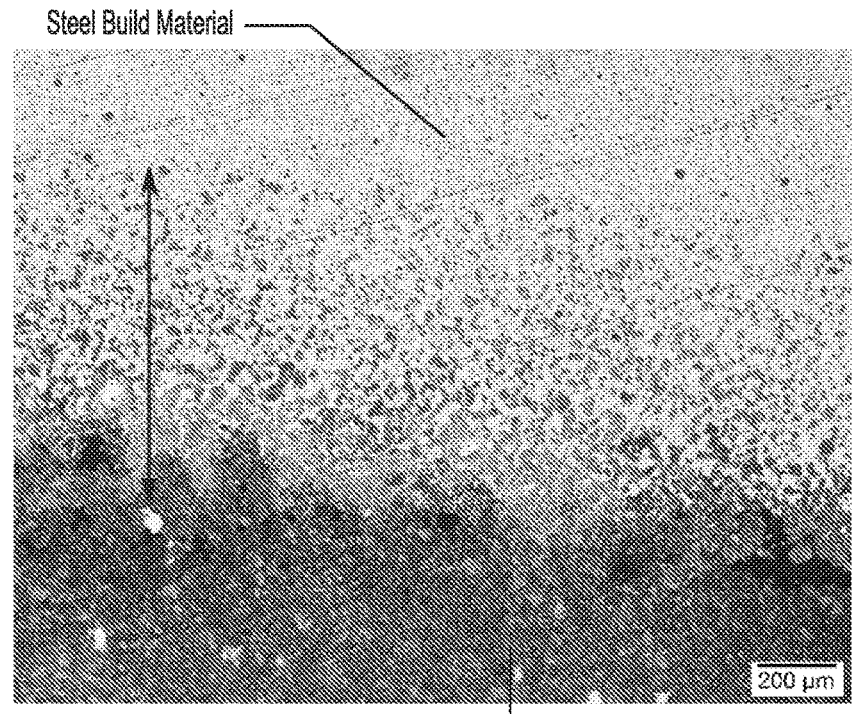
200 μm
Carbon Rich Steel Build Material
*Fig-9B*

THREE-DIMENSIONAL PRINTING

BACKGROUND

Three-dimensional (3D) printing is an additive manufacturing process used to make three-dimensional solid parts from a digital model. 3D printing techniques are considered additive manufacturing processes because they involve the application of successive layers of material (which, in some examples, may include build material, binder and/or other printing liquid(s), or combinations thereof). This is unlike traditional machining processes, which often rely upon the removal of material to create the final part. 3D printing is often used in rapid product prototyping, mold generation, mold master generation, and short run manufacturing for mass personalization and customization of goods.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4A is exposed to laser scanning;

FIG. 9A and FIG. 9B are optical microscopy images of an example object and a comparative object;

DETAILED DESCRIPTION

Figure 1:
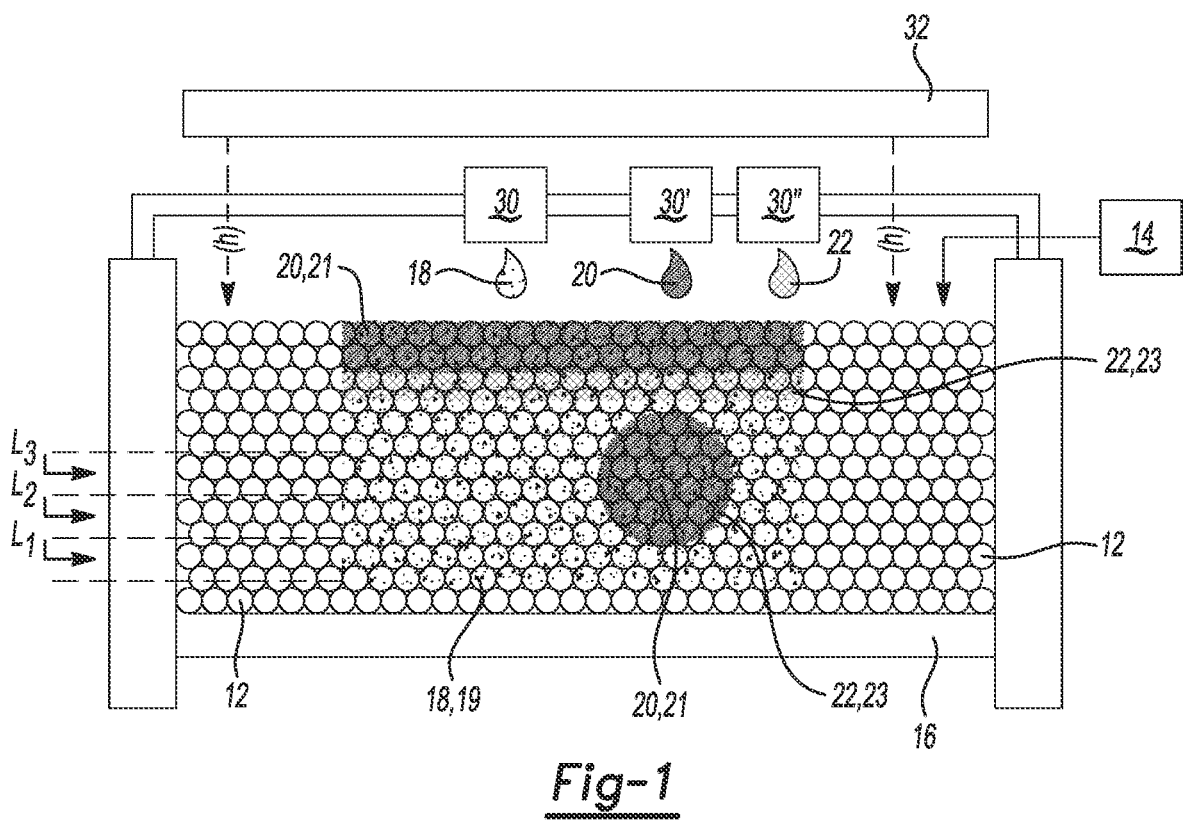
FIG. 1 graphically illustrates one example of the 3D printing methods disclosed herein.

The 3D printing techniques disclosed herein utilize a digital 3D model of the 3D object that is to be created, and this digital 3D model is sliced into multiple digital layers.

The digital layers are used as the model for the selective application of agents (e.g., a binder agent, an alloying agent, and/or a diffusion barrier agent), and in some instances, for the scan of a localized heat source.

In some examples of the three-dimensional (3D) printing method disclosed herein, a layer of a metal-base build material is applied to a build platform. Following the corresponding digital layer, the binder agent is selectively applied to the build material layer on a build platform to pattern the particular 3D object layer. Then, another layer of the build material is applied on the patterned layer. The binder agent is then selectively applied to this other layer in accordance with its corresponding digital layer, and these processes are repeated to form a green part (referred to herein as an "intermediate structure") of the 3D object that is ultimately to be formed. The binder agent is capable of spreading around an exterior surface of at least some of the build material particles and at least partially fills void spaces between the build material particles. Thus, the binder agent can at least partially penetrate the layer of the build material onto which it is applied. The binder agent includes polymeric particles, that when cured, temporarily hold the build material of the 3D intermediate structure together. The 3D intermediate structure is then exposed to additional heat treatments to de-bind and sinter the build material particles.

In other examples of the three-dimensional (3D) printing method disclosed herein, the layer of the metal-based build material is applied to a build platform. Following the corresponding digital layer, a localized heat source scans the build material layer, which melts and coalesces the exposed build material particles to generate the particular 3D object layer. An additional layer of build material is applied over the 3D object layer, and localized heat source exposure is again performed in accordance with the corresponding digital layer. This process is repeated for a desired number of layers to build the 3D object according to a digital 3D object model.

Both of the 3D printing methods disclosed herein also utilize an alloying agent and a diffusion barrier agent, or the diffusion barrier agent. In some examples, the alloying agent is used to pattern area(s) of the build material layer(s) that is/are to become site-specific alloyed sections of the 3D object. The diffusion barrier agent is used to pattern the build material layer(s) at an edge of at least a portion of the area(s) patterned with the alloying agent or at a predetermine portion that contains the alloying element (e.g., when the alloying element is pre-mixed with some of the metal-based build material). The diffusion barrier agent is capable of reducing the diffusion of element(s) of the alloying agent from the area(s) patterned with the alloying agent or including the alloying element to area(s) not patterned with the alloying agent or not including the alloying element. Both the alloying agent and the diffusion barrier agent are jettable via an inkjet print head, and thus can be deposited to desirable locations of the build material layer(s) at the voxel level.

The term "site-specific alloyed section" refers to a portion of the 3D object that has an alloyed composition as a result of the corresponding metal-based build material being patterned with the alloying agent or pre-mixed with the alloying element. The term "alloyed composition" refers to the alloy that forms from the interaction or reaction between the alloying element and the metal-based build material.

The term "non-alloyed section" refers to a portion of the 3D object that has a metal-based build material composition. The "metal-based build material composition" includes metal-based build material particles that have sintered or melted together. During the 3D printing process, the build material particles that make up the metal-based build material composition have not been patterned with the alloying agent or pre-mixed with the alloying element.

The term "diffusion barrier" refers to a portion of the 3D object that includes a diffusion barrier component intermingled with the metal-based build material composition and that may or may not include some alloyed composition. During the 3D printing process, the build material particles that make up the diffusion barrier have been patterned with the diffusion barrier agent, but have not been patterned with the alloying agent or pre-mixed with the alloying element. The extent to which the diffusion barrier reduces diffusion of the alloying element depends, at least in part, upon the thickness of the area(s) patterned with the diffusion barrier agent and the concentration of the diffusion barrier component in the diffusion barrier agent. In some instances, it may be desirable to reduce diffusion as much as possible. In these instances, the area(s) patterned with the diffusion barrier agent may be relatively thick and/or the diffusion barrier component in the diffusion barrier agent may be present at a relatively high concentration. In other instances, a gradient of the alloyed composition may be desirable in the diffusion barrier. In these instances, the area(s) patterned with the diffusion barrier agent may be relatively thin and/or the diffusion barrier component in the diffusion barrier agent may be present at a relatively low concentration. While examples of suitable diffusion barrier thicknesses and diffusion barrier element concentrations are provided herein, it is to be understood that the thicknesses and concentrations may vary depending upon the alloying element and build material composition that is used, as different alloying elements have different diffusion rates in different build material compositions.

Throughout this disclosure, a weight percentage that is referred to as "wt % active" refers to the loading of an active component of a stock formulation that is present, e.g., in a binder agent, alloying agent, etc. For example, an alloying element, such as carbon black, may be present in a water-based formulation (e.g., a stock solution or dispersion) before being incorporated into the alloying agent vehicle. In this example, the wt % active of the carbon black accounts for the loading (as a weight percent) of the carbon black solids that are present in the alloying agent, and does not account for the weight of the other components (e.g., water, etc.) that are present in the stock solution or dispersion with the carbon black. Also as used herein, a volume percentage refers to the ratio of the volume of a solute or solid that is present in solution or dispersion, relative to the total volume of the solution or dispersion.

Alloying Agent

Examples of the alloying agent include an alloying element and a vehicle.

The alloying element may be any element that can be dissolved or dispersed into the vehicle to generate a jettable fluid and that can alloy with a metal-based build material.

Examples of suitable alloying elements include platinum group metals (i.e., ruthenium, rhodium, palladium, osmium, iridium, and platinum), group 11 elements (i.e., copper, silver, gold), carbon (e.g., carbon black), group 6 elements (i.e., molybdenum, tungsten, chromium), boron, sulfur, silicon, nickel, tin, indium, magnesium, vanadium, niobium, titanium, manganese, zirconium, scandium, yttrium, lanthanum, and cerium. It is to be understood that carbon, boron, bismuth, sulfur, nickel, silicon, niobium, vanadium, zirconium, scandium, manganese, and molybdenum may be used at ambient conditions in small particle form, in part because they are not easily oxidized in this form. The carbon alloying elements may be in the form of carbon nanoparticles, carbon black nanoparticles, carbon nanotubes or graphene. The molybdenum or tungsten alloying elements may be in the form, respectively, of a molybdate (e.g., ammonium molybdate or sodium molybdate) or a tungstate (e.g., ammonium tungstate or sodium tungstate), or molybdenum- or tungsten-containing organometallics, or as molybdenum or tungsten nanoparticles. Copper, gold, and any of the platinum group metals may be in the form of nanoparticles. The boron alloying element may be in the form of borate (e.g., sodium borate or another water-soluble borate species) or boron nanoparticles. The chromium alloying element may be in the form of a salt containing chromium in an oxidized state (e.g., chromate salt), or nanoparticles, or an organometallic source of chromium (e.g., chromium hexacarbonyl or (benzene) chromium tricarbonyl). Titanium, magnesium, zirconium, and scandium elements can take the form of oxides. Yttrium, lanthanum, zirconium, magnesium, and cerium elements can be deposited in the form of oxide dispersants.

In the examples disclosed herein, it is to be understood that the nanoparticles are selected so that they generate a desirable alloy with the metal build material, and the metal salts are selected so that they decompose into the material that generates a desirable alloy with the metal build material. Unlike some of the binders disclosed herein, the alloying element becomes part of the 3D printed object.

Any of the alloying elements that are included as nanoparticles may have an average particle size (e.g., average diameter of the particles) ranging from about 2 nm to about 100 nm. A distribution of the alloying element nanoparticles (D10 to D90) may range from about 10 nm to about 75 nm with a median diameter (D50) of about 50 nm. In an example, the distribution values (D10, D50, D90) may be weighted by volume. The individual particle sizes can be outside of the distribution range, as D50 is defined as the median diameter at which about half of the particles are larger than the D50 value and about half of the other particles are smaller than the D50 value. Similarly, about 10% of the particles in the distribution are below the D10 value and about 90% of the particles in the distribution are below the D90 value. As noted, in an example, the distribution values may be volume-weighted mean diameters. In another example, the longest dimension of a carbon nanotube used as an alloying element (e.g., its length) may range from about 2 nm to about 100 nm.

The alloying element may be present in the alloying agent in an amount that enables good jettability from a desired inkjet printhead. When metal nanoparticles, carbon nanoparticles, or carbon nanotubes are included in the alloying agent, the amount may range from about 0.5 vol % to about 10 vol %, based on the total volume of the alloying agent. In one example, carbon nanoparticles may be present in the alloying agent in an amount of about 5 vol %. When metal salts (e.g., molybdate, tungstates, borates, or chromates) are included in the alloying agent, the amount may range from about 1 vol % to about 60 vol %, based on the total volume of the alloying agent. The amounts set forth herein may be varied if other jetting technologies are to be used. In terms of weight percent, the alloying element may be present in an amount ranging from about 0.5 wt % active to about 60 wt % active based on the total weight of the alloying agent, and these percentages may take into account the density of the particular alloying element.

The alloying agent also includes a vehicle. The term "vehicle" for the alloying agent refers to the liquid(s) into which the alloying element is introduced. In an example, the alloying agent vehicle may include at least some water (e.g., deionized water). The amount of water may depend, in part, on the type of jetting architecture that is to be used. For example, if the alloying agent is to be jettable via thermal inkjet printing, water may make up 35 wt % or more of the alloying agent. In one example, water makes up from about 70 wt % to about 75 wt % of the total weight of the alloying agent. For another example, if the alloying agent is to be jettable via piezoelectric inkjet printing, water may make up from about 25 wt % to about 30 wt % of the total weight of the alloying agent, and 35 wt % or more of the total weight of the alloying agent may be an organic co-solvent, such as ethanol, isopropanol, acetone, etc. Other example vehicles include no water and include one or more of the co-solvents disclosed herein.

In addition to, or as an alternative to water, any example of the alloying agent vehicle may include a (co-)solvent and a surfactant. Other additives may also be included, such as antimicrobial agent(s), dispersant(s), chelating agent(s), pH adjuster(s), and/or combinations thereof. In an example, the vehicle of the alloying agent includes a co-solvent, a surfactant, and a balance of water. In another example, the vehicle of the alloying agent consists of a co-solvent, a surfactant, and a balance of water. In still another example, the vehicle of the alloying agent consists of a co-solvent, a surfactant, an additive selected from the group consisting of antimicrobial agent(s), dispersant(s), chelating agent(s), and/or combinations thereof, and a balance of water.

Classes of organic (co-)solvents that may be used in the alloying agent include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs $(C_6-C_{12})$ of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Some examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the alloying agent in a total amount ranging from about 1 wt % to about 50 wt % based upon the total weight of the alloying agent, depending upon the jetting architecture of the applicator. In an example, the total amount of the co-solvent(s) present in the alloying agent is about 5 wt % based on the total weight of the alloying agent. In another example, the total amount of the co-solvent(s) present in the alloying agent is about 20 wt % based on the total weight of the alloying agent.

In some examples, the vehicle of the alloying agent includes surfactant(s) to improve the jettability of the alloying agent. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the alloying agent may range from about 0.01 wt % active to about 1 wt % active based on the total weight of the alloying agent. In an example, the total amount of surfactant(s) in the alloying agent may be about 0.75 wt % active based on the total weight of the alloying agent.

In some examples, the vehicle of the alloying agent includes an antimicrobial agent. Antimicrobial agents are also known as biocides and/or fungicides. Examples of suitable antimicrobial agents include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXCIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

In an example, the total amount of antimicrobial agent(s) in the alloying agent ranges from about 0.01 wt % active to about 0.05 wt % active (based on the total weight of the alloying agent). In another example, the total amount of antimicrobial agent(s) in the alloying agent is about 0.044 wt % active (based on the total weight of the alloying agent).

In some examples, the vehicle of the alloying agent includes dispersant(s). Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment-affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the alloying agent may range from about 1 wt % active to about 10 wt % active based on the total weight of the alloying agent. In an example, the total amount of dispersant(s) in the alloying agent may be about 0.75 wt % active based on the total weight of the alloying agent.

Chelating agents (or sequestering agents) may be included in the vehicle of the alloying agent to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the alloying agent may range from greater than 0 wt % active to about 1 wt % active based on the total weight of the alloying agent. In an example, the chelating agent(s) is/are present in the alloying agent in an amount of about 0.08 wt % active (based on the total weight of the alloying agent).

A pH adjuster may also be used to adjust the pH of alloying agent. In an example, the pH of the alloying agent ranges from about 7.5 to about 9.0. In another example, the pH of the alloying agent ranges from about 8.0 to about 8.5. In some examples, a buffer may be used as the pH adjuster. An example of a suitable buffer is MOPS (3-(N-morpholino) propanesulfonic acid), and an example of a suitable amount of the buffer ranges from about 0.1 wt % active to about 0.2 wt % active based on the total weight of the alloying agent.

Diffusion Barrier Agent

Examples of the diffusion barrier agent include a diffusion barrier component and a vehicle. The diffusion barrier component may be any element or compound that can be dissolved or dispersed into a vehicle to generate a jettable fluid and that is capable of restricting diffusion of an alloying element (that is contained in the alloying agent) from the site-specific alloyed section(s). The diffusion barrier component is selected to raise the chemical potential of the alloying element in the region(s) where the diffusion barrier component is present. The higher the concentration of an element, the higher its chemical potential, which drives the diffusion of the element from high concentration to low concentration. As such, by incorporating the diffusion barrier component in region(s) outside of the region(s) with a higher concentration of the alloying element, the chemical potential of the alloying element is raised at the boundary of the region(s) with the higher concentration of the alloying element, so that the diffusion of the alloying element out of this region(s) is suppressed.

Examples of suitable diffusion barrier elements may be selected from the group consisting of silicon, nickel, copper, chromium, vanadium, titanium, tantalum, carbon, aluminum, tantalum nitride, titanium nitride, titanium dioxide, titanium carbide, tungsten-titanium, yttria stabilized zirconia, a metal silicide, an amorphous alloy, hexagonal boron nitride, molybdenum disulfide, and ruthenium-titanium dioxide. It is to be understood that tungsten-titanium and ruthenium-titanium dioxide are alloys of the listed elements or element and compound. Examples of suitable metal silicides may have the chemical formula $M_2Si$, $MSi$, or $MSi_2$. Some specific examples include nickel silicides, such as $Ni_2Si$, $NiSi$, $Ni_5Si_2$, or $Ni_3Si$, cobalt silicides, such as $Co_2Si$, $CoSi$, $CoSi_3$, or $CoSi_2$, platinum silicides, such as $PtSi$, palladium silicides, such as $Pd_2Si$, titanium silicides, such as $TiSi_2$, molybdenum silicides, such as $MoSi$, tantalum silicides, such as $TaSi_2$, and tungsten silicides, such as $WSi_2$. Some specific examples of amorphous alloys include MoNi, NiW, and WZr.

In the examples disclosed herein, multiple diffusion barrier agents may be used together to form a multi-layer diffusion barrier. For example, the following diffusion barrier components may be present in separate diffusion barrier agents, which may be applied adjacent to one another to create a multi-layer diffusion barrier: $Pd_2Si$ and chromium, $CoSi_2$ and tungsten, $PtSi$ and TiN, $PtSi$ and TiC, $NiSi$ and TaN.

The selection of the diffusion barrier element depends upon the alloying element that is to be used, which depends upon the metal-based build material that is to be used and the alloyed composition that is to be formed in the 3D object. Any metal-based build material may be used, any alloying element that can alloy with the metal-based build material may be used, and any diffusion barrier component that can at least reduce the diffusion of the alloying element may be used. Some specific combinations include: i) the metal-based build material is an iron-based steel; the alloying element is carbon; and the diffusion barrier component is selected from the group consisting of silicon, nickel, copper, and tantalum; or ii) the metal-based build material is an aluminum-based build material; the alloying element is silicon; and the diffusion barrier component is a metal silicide selected from the group consisting of $M_2Si$, $MSi$, $MSi_2$, $Ni_2Si$, $NiSi$, $Ni_5Si_2$, $Ni_3Si$, $Co_2Si$, $CoSi$, $CoSi_2$, $PtSi$, $Pd_2Si$, $TiSi_2$, $CoSi_3$, $MoSi$, $TaSi_2$, $WSi_2$; or iii) the metal-based build material is a copper-based build material; the alloying element is silicon; and the diffusion barrier component is selected from the group consisting of tantalum, tantalum nitride, and titanium-tungsten; or iv) the metal-based build material is an iron-chromium alloy; the alloying element is palladium; and the diffusion barrier component is yttria stabilized zirconia; or v) the metal-based build material is an aluminum-based build material; the alloying element is silicon; and the diffusion barrier component is selected from the group consisting of chromium, vanadium, titanium, tantalum nitride, titanium nitride, titanium carbide, titanium-tungsten, and an amorphous alloy; or vi) the metal-based build material is an iron-based steel; the alloying element is nickel; and the diffusion barrier component is carbon; or vii) the metal-based build material is selected from the group consisting of martensitic stainless steel, austenitic stainless steel, and carbon-manganese steel; the alloying element is copper; and the diffusion barrier component is selected from the group consisting of tantalum, tantalum nitride, titanium nitride, aluminum, hexagonal boron nitride, molybdenum disulfide, and ruthenium-titanium dioxide.

Any of the diffusion barrier components that are included as nanoparticles may have an average particle size (e.g., average diameter of the particles) ranging from about 2 nm to about 100 nm. A distribution of the diffusion barrier component nanoparticles (D10 to D90) may range from about 10 nm to about 75 nm with a median diameter (D50) of about 50 nm. In an example, the distribution values (D10, D50, D90) may be weighted by volume. The individual particle sizes can be outside of the distribution range, as D50 is defined as the median diameter at which about half of the particles are larger than the D50 value and about half of the other particles are smaller than the D50 value. Similarly, about 10% of the particles in the distribution are below the D10 value and about 90% of the particles in the distribution are below the D90 value. As noted, in an example, the distribution values may be volume-weighted mean diameters. In another example, the longest dimension of a carbon nanotube used as an alloying element (e.g., its length) may range from about 2 nm to about 100 nm.

The diffusion barrier component may be present in the diffusion barrier agent in an amount that enables good jettability from a desired inkjet printhead. When nanoparticles are included in the diffusion barrier agent, the amount may range from about 0.5 vol % to about 10 vol %, based on the total volume of the diffusion barrier agent. In one example, silicon nanoparticles may be present in the alloying agent in an amount of about 5 vol %. The amounts set forth herein may be varied if other jetting technologies are to be used. In terms of weight percent, the alloying element may be present in an amount ranging from about 0.1 wt % active to about 60 wt % active (e.g., from about 0.1 wt % active to about 10 wt % active) based on the total weight of the diffusion barrier agent, and these percentages may take into account the density of the particular diffusion barrier component. The volume and/or weight percentage of the diffusion barrier component should be selected so that the diffusion barrier agent is jettable via the desired inkjet printhead.

The diffusion barrier agent also includes a vehicle. The term "vehicle" for the diffusion barrier agent refers to the liquid(s) into which the diffusion barrier component is introduced. In an example, the diffusion barrier agent vehicle may include at least some water (e.g., deionized water). The amount of water may depend, in part, on the type of jetting architecture that is to be used. For example, if the diffusion barrier agent is to be jettable via thermal inkjet printing, water may make up 35 wt % or more of the diffusion barrier agent. In one example, water makes up from about 70 wt % to about 75 wt % of the total weight of the diffusion barrier agent. For another example, if the alloying agent is to be jettable via piezoelectric inkjet printing, water may make up from about 25 wt % to about 30 wt % of the total weight of the diffusion barrier agent, and 35 wt % or more of the total weight of the diffusion barrier agent may be an organic co-solvent, such as ethanol, isopropanol, acetone, etc. Other example vehicles include no water and include one or more of the co-solvents disclosed herein.

In addition to, or as an alternative to water, any example of the diffusion barrier vehicle may include a (co-)solvent and a surfactant. Other additives may also be included, such as antimicrobial agent(s), dispersant(s), chelating agent(s), pH adjuster(s), and/or combinations thereof. In an example, the vehicle of the diffusion barrier agent includes a co-solvent, a surfactant, and a balance of water. In another example, the vehicle of the diffusion barrier agent consists of a co-solvent, a surfactant, and a balance of water. In still another example, the vehicle of the diffusion barrier agent consists of a co-solvent, a surfactant, an additive selected from the group consisting of antimicrobial agent(s), dispersant(s), chelating agent(s), and/or combinations thereof, and a balance of water.

Any of the organic (co-)solvents, surfactant(s), antimicrobial agent(s), dispersant(s), chelating agent(s), and/or pH adjuster(s) set forth herein for the alloying agent may be used in the diffusion barrier agent. Each of these components may be included in the respective amounts set forth herein, except that the total is with respect to the diffusion barrier agent instead of the alloying agent.

Binder Agent

The binder agent is a fluid that includes water and a binder that is effective for binding layers of particulate build material when forming a 3D intermediate structure.

The binder may be polymer particles, metal nanoparticles, metal salts, or polymer coating metal nanoparticles.

In some examples, the polymer particles are latex particles. Latex particles refer to any polymer (homopolymer, co-polymer, or heteropolymer) that is capable of being dispersed in an aqueous medium.

The polymer (latex) particles may have several different morphologies. In one example, the polymer particles can include two different copolymer compositions, which may be fully separated core-shell polymers, partially occluded mixtures, or intimately comingled as a polymer solution. In another example, the polymer particles can be individual spherical particles containing polymer compositions of hydrophilic (hard) component(s) and/or hydrophobic (soft) component(s) that can be interdispersed. In one example, the interdispersion can be according to IPN (interpenetrating networks) although it is contemplated that the hydrophilic and hydrophobic components may be interdispersed in other ways. In yet another example, the polymer particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the polymer particles can include 2, 3, or 4 or more relatively large polymer particles that can be attached to one another or can surround a smaller polymer core. In a further example, the polymer particles can have a single phase morphology that can be partially occluded, can be multiple-lobed, or can include any combination of any of the morphologies disclosed herein.

In some examples, the polymer (latex) particles can be homopolymers. In other examples, the polymer (latex) particles can be heteropolymers or copolymers. In an example, a heteropolymer can include a hydrophobic component and a hydrophilic component. In this example, the heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

Examples of monomers that may be used to form the hydrophobic component of the heteropolymer polymer (latex) particles include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific example monomers can include, C1 to C20 linear or branched alkyl (meth)acrylate, alicyclic (meth)acrylate, alkyl acrylate, styrene, methyl styrene, polyol (meth)acrylate, hydroxyethyl (meth)acrylate, or a combination thereof. In one specific class of examples, the polymer (latex) particles can be a styrene (meth)acrylate copolymer. In still another example, the polymer (latex) particles can include a copolymer with copolymerized methyl methacrylate being present at about 50 wt % or greater, or copolymerized styrene being present at about 50 wt % or greater. Both methyl methacrylate and styrene can be present, with one or the other being present at about 50 wt % or greater.

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder agent, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts.

In still other examples, the polymer (latex) particles in the binder agent include polymerized monomers of vinyl chloride, vinylidene chloride, vinylbenzyl chloride, vinyl ester, styrene, ethylene, maleate esters, fumarate esters, itaconate esters, α-methyl styrene, p-methyl styrene, methyl methacrylate, hexyl acrylate, hexyl methacrylate, hydroxyethyl acrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, 2-phenoxyethyl methacrylate, isobornyl acrylate, tetrahydrofurfuryl acrylate, benzyl methacrylate, benzyl acrylate, ethoxylated nonyl phenol methacrylate, isobornyl methacrylate, ethylene glycol dimethacrylate, diethylene glycol dimethacrylate, triethylene glycol dimethacrylate, cyclohexyl methacrylate, trimethyl cyclohexyl methacrylate, t-butyl methacrylate, n-octyl methacrylate, lauryl acrylate, lauryl methacrylate, tridecyl methacrylate, alkoxylated tetrahydrofurfuryl acrylate, isodecyl acrylate, dimethyl maleate, dioctyl maleate, acetoacetoxyethyl methacrylate, diacetone acrylamide, N-vinyl imidazole, N-vinylcarbazole, N-Vinylcaprolactam, pentaerythritol tri-acrylate, pentaerythritol tetra-acrylate, pentaerythritol tri-methacrylate, pentaerythritol tetra-methacrylate, glycidol acrylate, glycidol methacrylate, tetrahydrofuryl acrylate, tetrahydrofuryl methacrylate, diacetone acrylamide, t-butyl acrylamide, divinylbenzene, 1,3-butadiene, acrylonitrile, methacrylonitrile, combinations thereof, derivatives thereof, or mixtures thereof. These monomers include low glass transition temperature (Tg) monomers that can be used to form the hydrophobic component of a heteropolymer.

In some examples, a composition of the polymer (latex) particles can include acidic monomer(s). In some examples, the acidic monomer content can range from 0.1 wt % to 5 wt %, from 0.5 wt % to 4 wt %, or from 1 wt % to 2.5 wt % of the polymer particles with the remainder of the polymer particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are hydrophilic monomers that have a higher Tg than the low Tg hydrophobic monomers described herein. These acidic monomers can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

Any suitable polymerization process can be used to form the polymer (latex) particles. In some examples, an aqueous dispersion of polymer (latex) particles can be produced by emulsion polymerization or co-polymerization of any of the above monomers.

In one example, the polymer (latex) particles can be prepared by polymerizing high Tg hydrophilic monomers to form the high Tg hydrophilic component and attaching the high Tg hydrophilic component onto the surface of the low Tg hydrophobic component. In another example, the polymer (latex) particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the polymer (latex) particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the polymer (latex) particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method that can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the polymer (latex) polymer can have a weight average molecular weight (Mw, g/mol) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the polymer (latex) particles can be latent and can be activated by heat (which may be applied iteratively during 3D intermediate structure formation or after 3D intermediate structure formation) and water and co-solvent evaporation. In these instances, the activation temperature can correspond to the minimum film formation temperature (MFFT) or a glass transition temperature (Tg) which can be greater than ambient temperature. As mentioned herein, "ambient temperature" may refer to room temperature (e.g., ranging about 18° C. to about 22° C.). In one example, the polymer (latex) particles can have a MFFT or Tg that can be at least about 15° C. greater than ambient temperature. In another example, the MFFT or the Tg of the bulk material (e.g., the more hydrophobic portion) of the polymer (latex) particles can range from about 25° C. to about 200° C. In another example, the polymer (latex) particles can have a MFFT or Tg ranging from about 40° C. to about 120° C. In yet another example, the polymer (latex) particles can have a MFFT or Tg ranging from about 0° C. to about 150° C. In a further example, the polymer latex particles can have a Tg that can range from about −20° C. to about 130° C., or in another example from about 60° C. to about 105° C. At a temperature above the MFFT or the Tg of a latent latex polymer particle, the polymer particles can coalesce and can bind materials, such as the metal-based build material particles.

The polymer (latex) particles can have an average particle size (e.g., average diameter of the particles) that can be jetted via thermal ejection or printing, piezoelectric ejection or printing, drop-on-demand ejection or printing, continuous ejection or printing, etc. In an example, the average particle size of the polymer (latex) particles can range from about 1 nm to about 400 nm. In yet other examples, a particle size of the polymer particles can range from about 10 nm to about 300 nm, from about 50 nm to about 250 nm, from about 100 nm to about 250 nm, or from about 25 nm to about 250 nm.

In some examples, the polymer (latex) particles have a glass transition temperature higher than 60° C. and an average particle size of 1 nm or more.

In examples of the binder agent, the polymer particles can be present, based on a total weight of the binder agent, in an amount ranging from about 1 wt % active to about 40 wt % active. In other more detailed examples, the polymer particles can be present in an amount ranging from about 5 wt % active to about 30 wt % active, from about 12 wt % active to about 22 wt % active, from about 15 wt % active to about 20 wt % active, from about 10 wt % active to about 20 wt % active, or from about 6 wt % active to about 18 wt % active, based on the total weight of the binder agent.

Metal nanoparticles can also be used as the binder. Metal nanoparticles are smaller than the build material particles and can melt at lower temperatures, and thus can form a metal binding network to generate the intermediate structure. Any example of the metal nanoparticles set forth herein for the alloying agent may be used as the binder in the binding agent, except that the binder is selected to be the same material as the metal-based build material. This is because the metal nanoparticle binder is not removed in a de-binding step (like the polymer particles), but rather, becomes part of the 3D object.

Metal salts can also be used as the binder. Metal salts decompose into metal, and thus can form a metal binding network to generate the intermediate structure. Any example of the metal salts set forth herein for the alloying agent may be used as the binder in the binding agent, with the caveat that the metal formed from the metal salt decomposition should be the same material as the metal-based build material. This is because the metal binder is not removed in a de-binding step (like the polymer particles), but rather, becomes part of the 3D object.

In addition to the binder, the binder agent includes a binder agent vehicle. In one example, the binder agent vehicle is water. In another example, the binder agent vehicle includes water and one or more additives, such as co-solvent(s), surfactant(s), antimicrobial(s), viscosity modifier(s), pH adjuster(s), chelating agent(s), anti-kogation agent(s), and the like. In one example, water can be present in an amount ranging from about 30 wt % to 100 wt % of the binder agent vehicle component—excluding the polymer particles—based on a total weight of the binder agent vehicle. Put another way, the water can be present in an amount ranging from about 60 wt % to about 99 wt %, from about 65 wt % to 90 wt %, or from about 70 wt % to about 85 wt %, based on a total weight of the binder agent.

The co-solvent can be present in the binder agent in an amount ranging from about 0.5 wt % active to about 50 wt % active, based on a total weight of the binder agent. When a single co-solvent is included, the co-solvent that is selected is a plasticizer for the polymer (latex) particles in the binder agent. When multiple co-solvents are included, at least one of the co-solvents is a plasticizer for the polymer (latex) particles in the binder agent. Some examples of suitable plasticizing co-solvents include 2-pyrrolidone, dimethyl sulfoxide (DMSO), methyl 4-hydroxybenzoate, dioctyl phthalate, N-methyl-2-pyrrolidone (i.e., N-methyl-pyrrolidone), and mixtures thereof. Other examples of suitable plasticizers include N-2-hydroxyethyl-2-pyrrolidone (i.e., 1-(2-hydroxyethyl)-2-pyrrolidone), urea, ethylene carbonate, propylene carbonate, lactones, diethylene glycol, triethylene glycol, tetraethylene glycol, decalin, gamma-butyrolactone, dimethylformamide, and phenylmethanol.

Examples of other co-solvents that can be used in combination with the plasticizing co-solvent include any of the co-solvents described for the alloying agent.

Any examples of the surfactants set forth for the alloying agent may be used in the binder agent. Some specific examples include SURFYNOL® SEF (a self-emulsifiable wetting agent based on acetylenic diol chemistry), SURFYNOL® 104 (a non-ionic wetting agent based on acetylenic diol chemistry), or SURFYNOL® 440 (an ethoxylated low-foam wetting agent) (all available from Evonik Degussa); TERGITOL® TMN-6 (a branched secondary alcohol ethoxylate, non-ionic surfactant), TERGITOL® 15-S-5 or TERGITOL® 15-S-7 (each of which is a secondary alcohol ethoxylate, non-ionic surfactant), or DOWFAX® 2A1 or DOWFAX® 8390 (each of which is an alkyldiphenyloxide disulfonate, available from The Dow Chemical Company); CAPSTONE® FS-35 (non-ionic fluorosurfactant from DuPont); or a combination thereof.

The surfactant or combinations of surfactants can be present in the binder agent in an amount ranging from about 0.1 wt % active to about 5 wt % active based on the total weight, and in some examples, can be present in an amount ranging from about 0.5 wt % active to about 2 wt % active.

With respect to antimicrobials, any compound set forth for the alloying agent can be included in the binder agent. In an example, the example binder agent may include a total amount of antimicrobials that ranges from about 0.0001 wt % active to about 1 wt % active.

Viscosity modifiers and pH adjusters (e.g., acids, bases, or buffers) may also be present, as well as other additives to modify properties of the binder agent. A desirable pH for the binder agent ranges from about 3 to about 10, and a desirable viscosity for the binder agent is any that enables it to be jetted via a thermal and/or piezoelectric inkjet print head. Some examples of the binder agent have a pH ranging from about 6 to about 10, and other examples of the binder agent have a pH ranging from about 7 to about 7.5.

Chelating agents, such as EDTA (ethylene diamine tetra acetic acid) or any other example set forth for the alloying agent may be included in the binder agent. Whether a single chelating agent is used or a combination of chelating agents is used, the total amount of chelating agent(s) in the example binder agents may range from greater than 0 wt % active to about 2 wt % active based on the total weight of the binder agent.

Examples of the binder agent that are to be dispensed from a thermal inkjet printhead may also include from about 0.1 wt % to about 1 wt % of an anti-kogation agent, based on a total weight of the binder agent. Kogation refers to the deposit of dried solids on a thermal inkjet printhead. An anti-kogation agent can be included to prevent the buildup of dried solids on the printhead. Examples of suitable anti-kogation agents include oleth-3-phosphate (commercially available as CRODAFOS™ O3A or CRODAFOS™ N-3 acid), dextran 500k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Combined Alloying Agent and Binder Agent

The examples disclosed herein describe an alloying agent and a separate binder agent (i.e., binder agent). Separate agents allow for the patterning of the 3D object (with the binder agent) and the patterning for the site-specific alloyed section(s) of the 3D object to be separately controlled in examples of the method that utilize the binder agent. However, it is to be understood that the alloying element (of the alloying agent) and the polymer (latex) particles (of the binder agent) may be combined into a single alloying/binder agent. The combined alloying/binder agent may include the alloying element, the polymer particles, and any example of the vehicle described herein for the alloying agent and/or the binder agent. This combined alloying/binder agent may be useful so that the site-specific alloyed section(s) can be patterned with a single agent. It is to be understood that this combined alloying/binder agent may also be used with a separate binder agent that does not include the alloying element. In this example, the separate binder agent may be used to pattern portion(s) of the 3D object that are not to be alloyed, and the combined alloying/binder agent may be used to pattern portion(s) of the 3D object that are to be alloyed.

Metal-Based Build Materials

In the examples disclosed herein, the metal-based build material can include any metal-based particles. Metal-based particles include metal particles or metal alloy particles. As such, the terms "aluminum-based build material" and "aluminum-based particles" include both aluminum particles and aluminum alloy particles.

In an example, the metal-based particles are a single phase metallic material composed of one element. Examples of these metal particles include aluminum, titanium, molybdenum, tungsten, copper, iron, nickel, etc. In another example, the metal-based particles are composed of two or more elements, which may be in the form of a single phase metallic alloy or a multiple phase metallic alloy. Examples of these metal particles include ferrous alloys (e.g., iron-chromium alloys, low-to medium-carbon stainless steels,) titanium alloys, or carbon-manganese steel. In low-carbon stainless steel, the carbon level is 0.3% or less. In medium-carbon stainless steel, the carbon level ranges from about 0.31% to about 0.6%. Specific alloy examples can include stainless steel 304/304L (low-carbon), stainless steel GP1 (low-carbon), stainless steel 17-4PH (low-carbon), stainless steel 316/316L (low-carbon), stainless steel 430L (low carbon), titanium 6Al4V, titanium 6Al-4V ELI7. Inconel IN718, Inconel IN625, Maraging Steel MS1, Nickel Alloys HX, CoCr F75 and aluminum alloy 2000, 6000, 7000, and 8000 series. Metal carbides can also be suitable build materials, including tungsten carbide. While several example alloys have been provided, it is to be understood that other metal alloys may be used as the build material.

The average particle size of the metal-based particles can be similarly sized or differently sized. In one example, the average particle size of the metal-based particles can range from 0.5 μm to 200 μm. In some examples, the metal-based particles within a distribution can have a median diameter (D50) ranging from about 2 μm to about 150 μm, from about 1 μm to about 100 μm, from about 1 μm to about 50 μm, etc.

The shape of the metal-based particles can be spherical, non-spherical, random shapes, or a combination thereof.

The metal-based particles may be used in the metal-based build material composition without other additives, or may be used with other additives. Any of the metal-based build material compositions disclosed herein include from about 80 wt % to 100 wt % of the metal-based build material particles (based on the total weight of the build material composition). In other examples, the metal-based build material particles can be present in the composition in amounts ranging from about 90 wt % to 100 wt %, or from about 95 wt % to 100 wt %, or in an amount of 100 wt %. When the metal-based particles are present in the build material composition in an amount less than 100 wt %, the remainder of the build material composition may be made up of additives, such as flow aids (e.g., in amounts ranging from about 0.05 wt % to about 0.2 wt %), polymer powder material, etc.

Some examples of the metal-based build material may also include the diffusion barrier component. As one example, the metal-based build material (e.g., iron based alloy) may include some silicon particles. In these instances, a diffusion barrier agent containing the same diffusion barrier component may be used to pattern the diffusion barrier, and the concentration of the diffusion barrier component in the agent may be lower than when the agent is used with build material that does not include the diffusion barrier component.

Some examples of the metal-based build material may also include the alloying element pre-mixed therein. In these instances, the alloying agent is not used. The term "mixed build material" is used herein to refer to the pre-mixed metal-based build material and the alloying element.

Three Dimensional Printing Methods

Some examples of the printing methods disclosed herein utilize the binder agent, the alloying agent, the diffusion barrier agent, and a heat treatment to generate the 3D object having the site-specific alloyed section(s) and the diffusion barrier(s) within the 3D object.

One example of this method includes: based on a digital 3D object model of the 3D object, patterning individual layers of a metal-based build material with a binder agent to form an intermediate structure; based on the digital 3D object model, patterning a first portion of at least one of the individual layers with an alloying agent to form a pattern of the site-specific alloyed section; based on the digital 3D object model, patterning a second portion of at least one of the individual layers with a diffusion barrier agent to form a perimeter pattern at an edge of at least a portion of the pattern of the site-specific alloyed section; and exposing the intermediate structure to a heat treatment to form the 3D object. This example method will be further described in reference to FIG. 1, FIG. 2A, and FIG. 2B. In this example method, it is to be understood that the portions (e.g., first portion, second portion) that are patterned with the alloying agent or the diffusion barrier agent are also patterned with the binder agent so that these portions are bound as part of the intermediate structure.

Other examples of the printing methods disclosed herein utilize the alloying agent or the alloying element pre-mixed in with some of the metal-based build material, the diffusion barrier agent, and a localized heat source to generate the 3D object having the site-specific alloyed section(s) and the diffusion barrier(s) within the 3D object. One example of this method includes: applying a metal-based build material to form a build material layer, wherein a predetermined portion of the build material layer includes an alloying element; based on the digital 3D object model, patterning a portion of the build material layer with a diffusion barrier agent to form a perimeter pattern at an edge of at least part of the predetermined portion; and using a localized heat source to scan the build material layer based on the digital 3D object model, thereby forming a layer of the 3D object. This example method will be further described in reference to FIG. 3A through FIG. 3C and FIG. 4A and FIG. 4B.

As shown in FIG. 1, the metal-based build material 12 is deposited from a build material source 14 onto a build area platform 16 where it can be flattened or smoothed, such as by a mechanical roller or other flattening mechanism or technique, to form an individual layer $L_1, L_2, L_3 \ldots L_x$. Each layer $L_1, L_2, L_3 \ldots L_x$ of the metal-based build material 12 has a substantially uniform thickness across the build area platform 16. In an example, the thickness of the build material layer $L_1, L_2, L_3 \ldots L_x$ ranges from about 90 µm to about 110 µm, although thinner or thicker layers may be used. For example, the thickness of each build material layer $L_1, L_2, L_3 \ldots L_x$ may range from about 50 µm to about 200 µm. In another example, the thickness of each build material layer $L_1, L_2, L_3 \ldots L_x$ ranges from about 30 µm to about 300 µm. The layer $L_1, L_2, L_3 \ldots L_x$ thickness may be about 2× (i.e., 2 times) the average particle size of the metal-based build material 12 at a minimum for finer part definition. In some examples, the layer $L_1, L_2, L_3 \ldots L_x$ thickness may be about 1.2× the average particle size of the metal-based build material 12.

In this example method, after each individual layer $L_1, L_2, L_3 \ldots L_x$ is deposited, it may be patterned with the binder agent 18 or with the binder agent 18 and the alloying agent 20 or with the binder agent 18 and the diffusion barrier agent 22.

The binder agent 18 (without the alloying agent 20 or the diffusion barrier agent 22) is used to pattern any portion of the individual layer $L_1, L_2, L_3 \ldots L_x$ that is to become part of the 3D object 10 (see FIG. 2B), but is not to have the alloyed composition or include the diffusion barrier component 23. The binder agent 18 delivers the binder 19 to the individual layers $L_1, L_2, L_3 \ldots L_x$ of the metal-based build material 12. The portions of the individual layer $L_1, L_2, L_3 \ldots L_x$ that are patterned with the binder agent 18 alone become the non-alloyed sections 24 of the 3D object 10 (see FIG. 2B). The composition and microstructure of the non-alloyed section 24 in the 3D object 10 are dictated by the metal-based build material 12 that is used. In some examples, the non-alloyed section 24 forms the bulk of the 3D object 10.

The combination of the binder agent 18 and alloying agent 20 is used to pattern any portion of the individual layer $L_1, L_2, L_3 \ldots L_x$ that is to become a site-specific alloyed section 26 (see FIG. 2B) of the 3D object 10. The binder agent 18 delivers the binder 19, and the alloying agent 20 delivers the alloying element 21 to portion(s) of the individual layers $L_1, L_2, L_3 \ldots L_x$ of the metal-based build material 12 that is/are to become site-specific alloyed section(s) 26. The site-specific alloyed section 26 that forms at the portion patterned with the binder agent 18 and the alloying agent 20 has the alloyed composition. In some examples, the alloyed composition (and thus the site-specific alloyed section 26) has a different microstructure after sintering than the microstructure of the non-alloyed section 24 of the 3D object 10 after sintering, due, for example, to a phase transformation. The phase transformation results from the interaction or reaction between the alloying element 21 in the alloying agent 20 and the metal-based build material 12. In one example of the 3D printed object 10, the non-alloyed section 24 has a ferritic microstructure, and the site-specific alloyed section(s) 26 has a pearlite microstructure.

The combination of the binder agent 18 and diffusion barrier agent 22 is used to pattern any portion of the individual layer $L_1, L_2, L_3 \ldots L_x$ that is to become a diffusion barrier 28, 28' (see FIG. 2B) of the 3D object 10. The binder agent 18 delivers the binder 19, and the diffusion barrier agent 22 delivers the diffusion barrier component 23 to portion(s) of the individual layers $L_1, L_2, L_3 \ldots L_x$ of the metal-based build material 12 that is/are to become diffusion barrier(s) 28, 28'. The diffusion barrier agent 22 is deposited between at least some of the build material 12 patterned with the binder agent 18 alone and at least some of the build material 12 patterned with both the binder agent 18 and the alloying agent 20. As such, the diffusion barrier agent 22 is deposited at an edge of at least a portion of the pattern of the site-specific alloyed section 26. The diffusion barrier agent 22 forms a perimeter pattern at the edge(s) of the pattern of the site-specific alloyed section 26. In some instances, the diffusion barrier agent 22 is selectively applied so that the perimeter pattern is defined around the entire pattern of the site-specific alloyed section 26. In the example shown in FIG. 1, the diffusion barrier agent 22 is used to i) pattern the perimeter of the circular/spherical pattern that is generated with the binder agent 18 and the alloying agent 22, which will form the diffusion barrier 28 shown in FIG. 2B, and ii) pattern a planar section that separates some of the build material 12 patterned with the binder agent 18 from some of the build material 12 patterned with the binder agent 18 and the alloying agent 22, which will form the diffusion barrier 28' shown in FIG. 2B.

The diffusion barrier 28, 28' that forms at the portion patterned with the binder agent 18 and the diffusion barrier agent 22 includes the diffusion barrier component 23 intermingled with the metal-based build material composition, and may or may not include some of the alloyed composition. Whether the diffusion barrier 28, 28' includes some of the alloyed composition depends upon the chemical potentials of the alloying element 21 and the diffusion barrier component 23, the thickness of the diffusion barrier pattern, and/or the concentration of the diffusion barrier component 23 in the diffusion barrier agent 22.

The binder agent 18 can be ejected onto the portion(s) of the metal-based build material 12 in a particular layer $L_1$, $L_2$, $L_3 \ldots L_x$ from a fluid ejector 30 (such as a thermal inkjet printhead or a piezoelectric inkjet printhead). The fluid ejector 30 allows for (spatially) selective patterning of the metal-based build material 12 layer by layer. The deposition of the binder agent 18 in a particular layer $L_1$, $L_2$, $L_3 \ldots L_x$ is based on the slice of the particular layer $L_1$, $L_2$, $L_3 \ldots L_x$ from the digital 3D object model (e.g., a computer model).

The alloying agent 20 can be ejected onto desired portion(s) of the metal-based build material 12 in a particular layer $L_1$, $L_2$, $L_3 \ldots L_x$ from a fluid ejector 30' (such as a thermal inkjet printhead or a piezoelectric inkjet printhead). The fluid ejector 30' also allows for (spatially) selective patterning of the metal-based build material 12 layer by layer. The deposition of the alloying agent 20 in a particular layer $L_1$, $L_2$, $L_3 \ldots L_x$ is based on the slice of the particular layer $L_1$, $L_2$, $L_3 \ldots L_x$ from the digital 3D object model (e.g., a computer model), when the slice includes the desired locations of the site-specific alloyed section 26.

The diffusion barrier agent 22 can be ejected onto desired portion(s) of the metal-based build material 12 in a particular layer $L_1$, $L_2$, $L_3 \ldots L_x$ from a fluid ejector 30" (such as a thermal inkjet printhead or a piezoelectric inkjet printhead). The fluid ejector 30" also allows for (spatially) selective patterning of the metal-based build material 12 layer by layer. The deposition of the diffusion barrier agent 22 in a particular layer $L_1$, $L_2$, $L_3 \ldots L_x$ is based on the slice of the particular layer $L_1$, $L_2$, $L_3 \ldots L_x$ from the digital 3D object model (e.g., a computer model), when the slice includes the desired locations of the diffusion barrier 28, 28'.

The specified concentration of the alloying element 21 that is delivered to some portion(s) of the build material 12 depends upon a variety of factors including the concentration of the alloying element 21 in the alloying agent 20, the build material 12 that is used, and the deposition swath. The following equations may be used to determine the alloying element concentration per layer L1, L2, L3 . . . . Lx of build material 12:

$$[w] \times [l] \times [m] \times [C] = \text{alloying element weight per pass } (WPP)$$

$$[l] \times [w] \times [t] \times [D] \times [\rho] = \text{build material weight } (BMW)$$

$$\frac{WPP \times \text{number of passes}}{WPP \times \text{number of passes} + BMW} =$$

alloying element concentration per layer where w and l represent the deposition swath width and length, respectively, and are multiplied by the spatial resolution (e.g., dots per inch (dpi)) in the respective direction; m is the mass of each droplet; C is the alloying element mass in the alloying agent 20; [t] is the powder layer thickness; D is the packing density of the metal-based build material 12; and $\rho$ is the density of the metal-based build material 12. The packing density D and the density $\rho$ are specific to the build material 12 that is used. Depending on the build material 12 characteristics, the packing density D is estimated to change from 0.3 to 0.6.

The specific concentration of the alloying element 21 that is delivered to the portion of the build material 12 that are to become the site-specific alloyed portion(s) 26 may be controlled by varying the deposition resolution width (w) and length (l) from 300-1200 dpi and 300-600 dpi, respectively, adjusting the build material layer thickness (t) (e.g., to as fine as 60 μm), and by adjusting the number of deposition passes (i.e., printing passes).

Some examples of the method include applying the alloying agent 20 over multiple printing passes. The number of printing/deposition passes influences the local alloying element concentration, which affects the alloyed composition that is formed and its properties. Thus, the number of printing/deposition passes can be controlled to tune the microstructure and the hardness of the alloyed composition in the site-specific alloyed section 26. In an example, the site-specific alloyed section 26 of the 3D object 10 exhibits a hardness correlating with a number of the multiple printing passes. Each pass may deliver a fraction of the total desired amount that is to be applied.

The multiple printing/deposition passes may be performed sequentially, or a pause between printing/deposition passes may be desirable to allow the alloying agent 20 to at least partially penetrate the layer $L_1$, $L_2$, $L_3 \ldots L_x$ of build material 12.

The specified concentration of the diffusion barrier component 23 that is delivered to some portion(s) of the build material 12 depends upon a variety of factors including the concentration of the diffusion barrier component 23 in the diffusion barrier agent 22, the alloying element 21 that is used, the build material 12 that is used, the thickness of the diffusion barrier 28, 28' that is to be formed, and the deposition swath. The equations above may be used to determine the diffusion barrier component concentration per layer $L_1$, $L_2$, $L_3 \ldots L_x$ of build material 12, where C is the diffusion barrier component mass in the diffusion barrier agent 22 and the rest of the variables are as characterized herein.

Some examples of the method include applying the diffusion barrier agent 22 over multiple printing passes. The number of printing/deposition passes influences the local diffusion barrier component concentration, which can affect alloying element diffusion. Thus, the number of printing/deposition passes can be controlled to increase the diffusion barrier component concentration and decrease the alloying element diffusion. Each pass may deliver a fraction of the total desired amount that is to be applied.

The multiple printing/deposition passes may be performed sequentially, or a pause between printing/deposition passes may be desirable to allow the diffusion barrier agent 22 to at least partially penetrate the layer $L_1$, $L_2$, $L_3 \ldots L_x$ of build material 12.

The diffusion barrier agent 22 can also be applied in a desirable thickness, which is measured from the edge of the pattern of the site-specific alloyed section 26. For example, when the concentration of the diffusion barrier component 23 in the diffusion barrier agent 22 is relatively low (e.g., from about from about 0.5 vol % to about 5 vol %), the thickness of the pattern of the applied diffusion barrier agent 22 may be increased to decrease diffusion of the alloying element during heating. The thickness may vary depending, at least in part, upon the size of the 3D object being formed, the concentration of the diffusion barrier component 23 in the diffusion barrier agent 22, the diffusion rate of the alloying element, etc. In some examples, the thickness of the region patterned with the diffusion barrier agent 22 may range from about 0.1 mm to about 5 mm.

While several layers $L_1$, $L_2$, $L_3 \ldots L_x$ are shown deposited and patterned in FIG. 1, it is to be understood that each individual layer $L_1, L_2, L_3 \ldots L_x$ is deposited and patterned with the desired agent(s) 18, 20, 22 before a subsequent layer $L_2, L_3 \ldots L_x$ is deposited and patterned.

After each individual layer $L_1, L_2, L_3 \ldots L_x$ is deposited and patterned with the binder agent 18 and/or the binder agent 18 and the alloying agent 20, and/or the binder agent 20 and the diffusion barrier agent 22, the build platform 16 can be dropped a distance of (x), which can correspond to at least the thickness of a patterned layer, so that another layer $L_2, L_3 \ldots L_x$ of the metal-based build material 12 can be added thereon and patterned. In this example of the method, the process can be repeated on a layer-by-layer basis until all of the desired layers are patterned in accordance with the digital 3D object model.

Heat (h) can be used, such as from a heat source 32, to remove water and/or co-solvent(s) from the various layers $L_1, L_2, L_3 \ldots L_x$ throughout the patterning process. This temperature is 120° C. or less. In an example, this temperature may range from about 50° C. to about 120° C. In one example, heat can be applied from overhead, e.g., prior to application of the next layer of metal-based build material 12, or after multiple layers $L_1, L_2, L_3 \ldots L_x$ are patterned, and/or can be provided by the build area platform 16 from beneath the metal-based build material 12. The build material source 14 can also be used to preheat the metal-based build material 12 prior to dispensing it on the build area platform 16 or on a previously applied and patterned layer $L_1, L_2, L_3 \ldots L_x$.

The ejector(s) 30, 30', 30" deposit the binder agent 18, the alloying agent 20, and the diffusion barrier agent 22 in a pattern that corresponds to the layers of the 3D object 10, and can be used to form a 3D intermediate structure in any orientation with respect to the X-Y plane of the build area platform 16, and thus with respect to the layers $L_1, L_2, L_3 \ldots L_x$ of the build material 12. For example, the 3D intermediate structure can be printed from bottom to top in the Z-direction, or at an inverted orientation (e.g., from top to bottom) in the Z-direction. For another example, the 3D intermediate structure can be printed at an angle or on its side. The orientation of the build within the build material 12 can be selected in advance or even by the user at the time of printing, for example.

After all of the desired portions of the layers $L_1, L_2, L_3 \ldots L_x$ of metal-based build material 12 are patterned with the binder agent 18 and/or the binder agent 18 and the alloying agent 20 (or alternatively, the combined binder/alloying agent) and/or the binder agent 18 and the diffusion barrier agent 22, low temperature heating of all of the individually patterned layers may be performed. This low temperature heating is performed at a temperature ranging from about 120° C. to about 400° C., depending upon the type of binder 19 used.

When polymer particles are used as the binder 19, at this low temperature range, heating evaporates remaining water and/or co-solvents from the agent(s) 18, 20, 22 and causes the (latex) polymer particles to coalesce and form a strong film 19' (in this example, a polymer film) among the patterned metal-based build material particles 12, generating a bound structure.

When metal nanoparticles are used as the binder 19, at this low temperature range, heating evaporates remaining water and/or co-solvents from the agent(s) 18, 20, 22 and causes the metal nanoparticles to melt and form a strong film 19' (in this example, a metal film) among the patterned metal-based build material particles 12, generating a bound structure.

When metal salt is used as the binder 19, at this low temperature range, heating evaporates remaining water and/or co-solvents from the agent(s) 18, 20, 22 and causes the metal salt to decompose into the same type of metal as the build material particles and form a strong film 19' (in this example, a metal film) among the patterned metal-based build material particles 12, generating a bound structure.

Figure 2A:
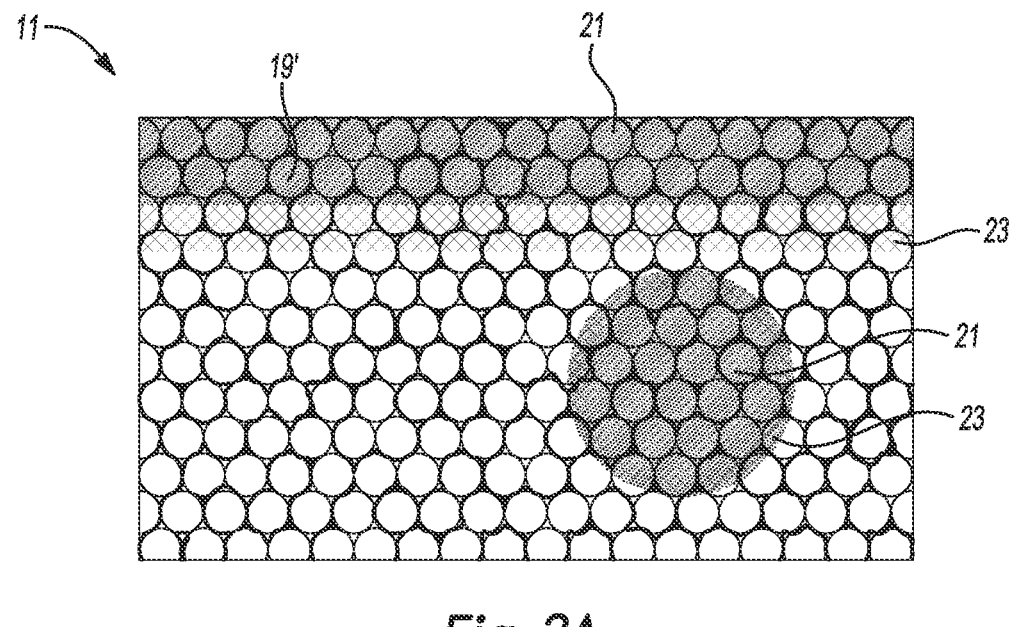
FIG. 2A is a cross-sectional view of the intermediate 3D structure formed via the method shown in FIG. 1.

The bound structure is the 3D intermediate structure 11 shown in FIG. 2A. It is to be understood that any non-patterned build material 12 surrounding the 3D intermediate structure 11 remains non-bound and can be removed.

The 3D intermediate structure 11 can then be moved to a heating device, such as a sintering oven, for exposure to the heat treatment. When polymer particles are used as the binder 19, the heat treatment involves exposure (of the 3D intermediate structure 11) to a de-binding temperature for a first predetermined time; and then exposure (of the 3D intermediate structure 11) to a sintering temperature for a second predetermined time.

It is to be understood that at the de-binding temperature, the network of the polymer particles (film 19') can thermally degrade, thereby de-binding the 3D intermediate structure 11. The de-binding temperature range can vary, depending on the composition of the polymer network. As an example, the de-binding temperature may range from about 400° C. to about 1,000° C. The de-binding temperature may be held for a duration ranging from about 30 minutes to about 480 minutes.

When metal nanoparticles are, or a metal salt is used as the binder 19, the heat treatment involves exposure (of the 3D intermediate structure 11) to a sintering temperature for a predetermined time.

In any of the examples, the sintering temperature range can vary, depending on the metal-based build material 12. In one example, the sintering temperature can range from about 10° C. below the melting temperature of the metal-based particles to about 50° C. below the melting temperature of the metal-based particles. In another example, the sintering temperature can range from about 100° C. below the melting temperature of the metal-based particles to about 200° C. below the melting temperature of the metal-based particles. The sintering temperature can also depend upon the particle size and period of time that heating occurs, e.g., at a high temperature for a sufficient time to cause particle surfaces to become physically merged or composited together. In one example, the sintering temperature ranges from about 1,000° C. to about 2,200° C. As a specific example, the sintering temperature for stainless steel can be about 1,400° C. Temperatures outside of these ranges can be used as determined for different metal-based particles.

In some examples, during heating in the oven, the heating device can include an inert atmosphere to avoid oxidation of the metal-based particles. In one example, the inert atmosphere can be oxygen-free and can include a noble gas, an inert gas, or combination thereof. For example, the inert atmosphere can include a noble gas, or an inert gas (e.g., argon, nitrogen). In other instances, a reducing gas (e.g., hydrogen) may be used.

During the heat treatment, the alloying element 21 in the portions patterned with the alloying agent 20 interact or react with the metal-based build material 12 to form the alloyed composition. The interaction or reaction will depend upon the alloying element 21 and the metal-based build material 12. In one example, the portion of the at least one of the individual layers $L_1, L_2, L_3 \ldots L_x$ patterned with the alloying agent 20 undergoes a phase change during the heat treatment. As a specific example, a carbon alloying element in a low alloy steel build material undergoes a phase transformation from the soft ferritic microstructure to the harder pearlite microstructure, which combines ferrite and carbides arranged in a fine lamellar structure. In this particular example, the bulk portion 24 of the 3D object 10 (that had been patterned with the binder agent 18 alone) has a ferritic microstructure (from the low alloy steel build material), and the site-specific alloyed section 26 (that had been patterned with both the binder agent 18 and the alloying agent 20) has a pearlite microstructure (due to the phase transformation of the carbon alloying element).

Also during the heat treatment, the diffusion barrier component 23 in the diffusion barriers 28, 28' suppresses (e.g., reduces or prevents) the diffusion of the alloying element 21 from the site-specific alloyed section(s) 26 to the non-alloyed section(s) 24. This can form discrete site-specific alloyed section(s) 26 and non-alloyed section(s) 24, where the intermediate diffusion barrier(s) 28, 28' includes a minimal amount or none of the alloyed composition. Alternatively, this can form an intermediate diffusion barrier(s) 28, 28' that includes a gradient of the alloyed composition, in which the concentration of the alloyed composition is higher closer to the site-specific alloyed section(s) 26 and the concentration of the alloyed composition is lower closer to the non-alloyed section(s) 24.

Figure 3A:
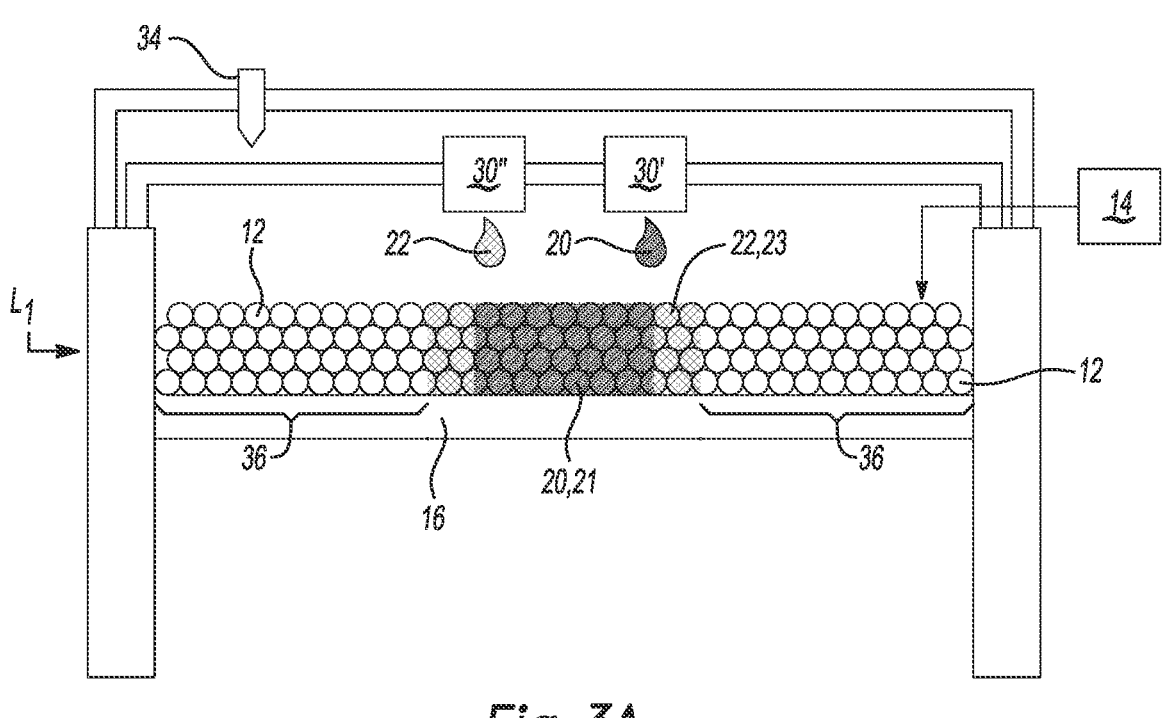
FIGS. 3A through 3C graphically illustrate another example of the 3D printing methods disclosed herein.
Figure 3B:
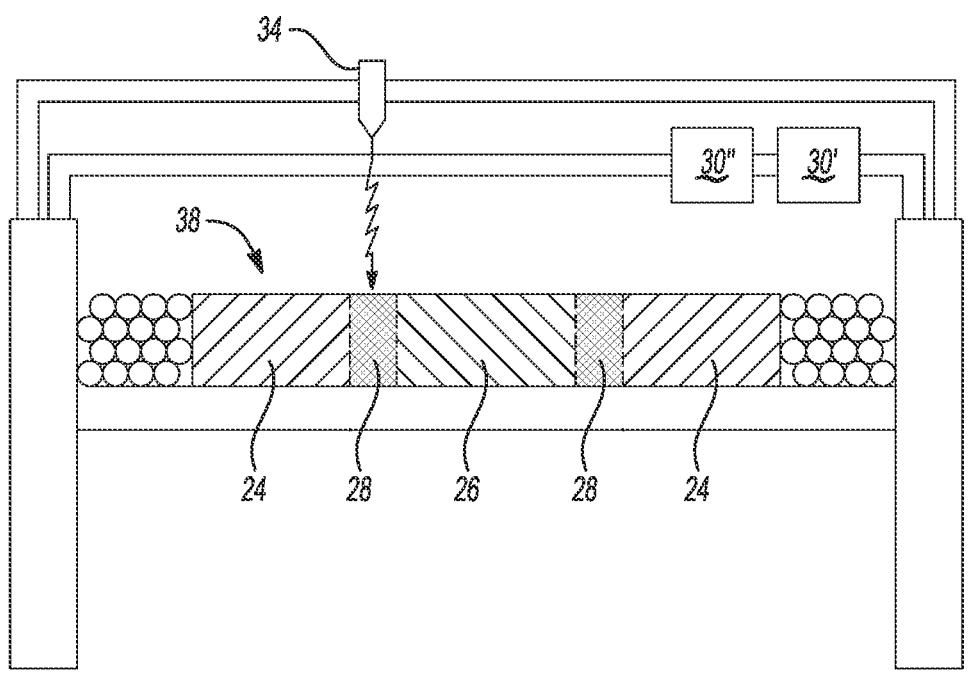
Figure 3C:
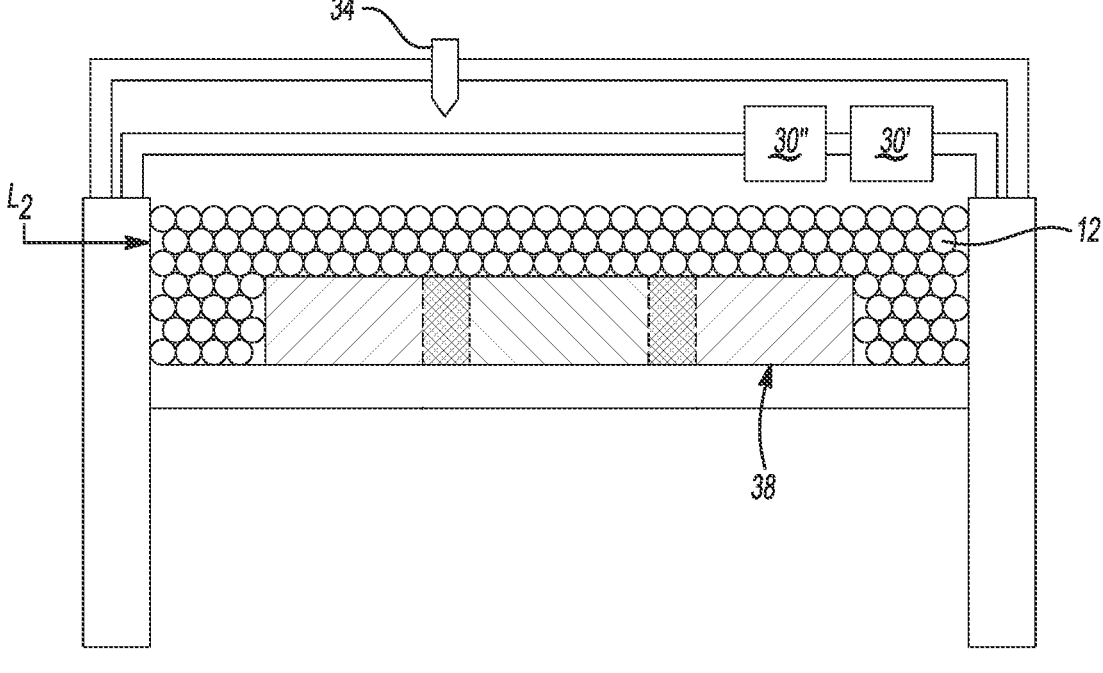

Referring now to FIG. 3A through FIG. 3C, another example of the method is depicted where the 3D object is built in a layer by layer fashion. As shown in FIG. 3A, the metal-based build material 12 is deposited from the build material source 14 onto the build area platform 16 where it can be flattened or smoothed, such as by a mechanical roller or other flattening mechanism or technique, to form the individual layer $L_1$. The thickness of the layer $L_1$ (and any subsequently deposited layers) may be within the range provided herein.

Figure 4A:
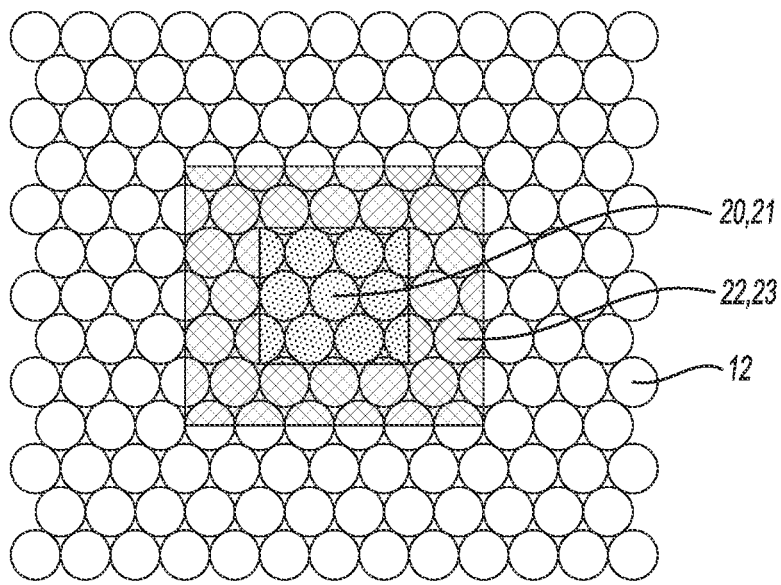
FIG. 4A is a top view of the build material layer of FIG. 3A patterned with an alloying agent and a binder diffusion agent.
Figure 4B:
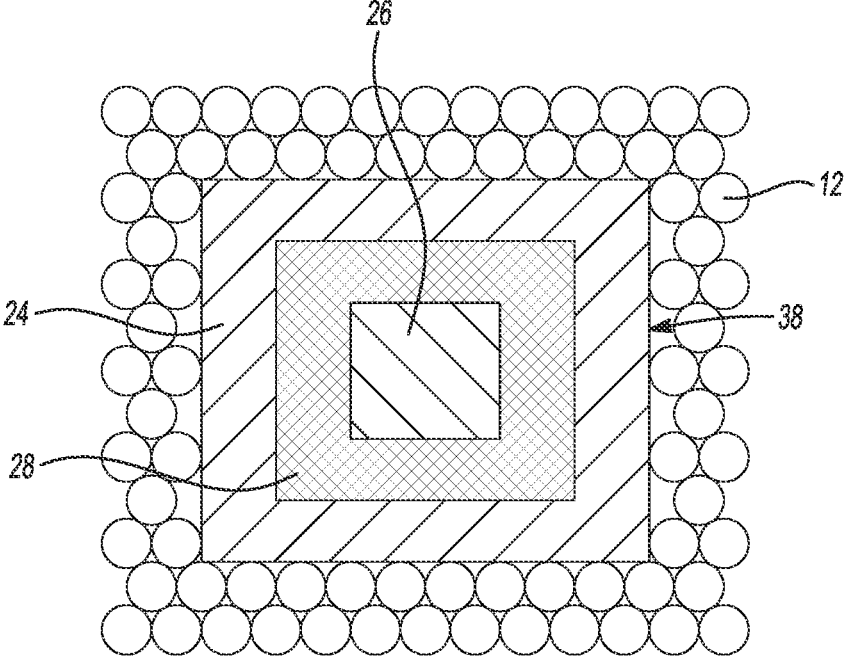
FIG. 4B is a top view of the 3D object layer after the build material layer of FIG. 3A

When the metal-based build material 12 does not include the alloying element 21 pre-mixed therein, the alloying agent 20 is used to pattern any portion of the layer $L_1$ that is to become a site-specific alloyed section 26 (see FIG. 3A and FIG. 4B). As such, some examples of this method include generating the predetermined portion (i.e., the portion of the build material layer $L_1$ including the alloying element 21) by patterning a section of the build material layer $L_1$ with an alloying agent 20 that contains the alloying element 21. The alloying agent 20 delivers the alloying element 21 to portion(s) of the layer $L_1$ of the metal-based build material 12 that is/are to become site-specific alloyed section(s) 26. The site-specific alloyed section 26 that forms at the portion patterned with the alloying agent 20 has the alloyed composition.

In another example of this method (not depicted in the figures), some of the metal-based build material 12 is pre-mixed with the alloying element 21, and this mixed build material is used to generate the predetermined portion. In these examples, the alloying agent 20 is not used to pattern any portion of the layer $L_1$. Rather, the pre-mixed build material composition is applied at area(s) that are to become the site-specific alloyed section 26. As such, some examples of this method include generating the predetermined portion (i.e., the portion of the build material layer 12 including the alloying element 21) by mixing the alloying element 21 with some of the metal-based build material to generate a mixed build material; and applying the mixed build material instead of metal-based build material 12 at a predetermined location for the predetermined portion. In this example, both the metal-based build material 12 and the mixed build material are applied to form the build material layer $L_1$ and the mixed build material is specifically applied in area(s) that are to become the site-specific alloyed section(s) 26 of the 3D object.

Whether the predetermined portion of the build material layer 12 including the alloying element 21 is generating using the alloying agent 20 or by pre-mixing the alloying element 21 with the metal-based build material 12, the diffusion barrier agent 22 is used to pattern any portion of the layer $L_1$ that is to become a diffusion barrier 28 (see FIG. 4B). The diffusion barrier agent 22 delivers the diffusion barrier component 23 to portions of the layer $L_1$ of the metal-based build material 12 that is/are to become diffusion barrier(s) 28. The diffusion barrier agent 22 is deposited between at least some of the build material 12 patterned with the alloying agent 20 or pre-mixed with the alloying element 21, and at least some of the build material 12 that remains non-patterned or has not be mixed with the alloying element 21 (e.g., sections 36 in FIG. 3A). As such, the diffusion barrier agent 22 is deposited at an edge of at least a portion of the pattern of the site-specific alloyed section 26 or the predetermined portion containing the alloying element 21. The diffusion barrier agent 22 forms a perimeter pattern at the edge(s) of the pattern of the site-specific alloyed section 26 or the edges(s) of the predetermined portion containing the alloying element 21. In some instances, the diffusion barrier agent 22 is selectively applied so that the perimeter pattern is defined around the entire pattern of the site-specific alloyed section 26 or the entire predetermined portion containing the alloying element 21.

Figure 2B:
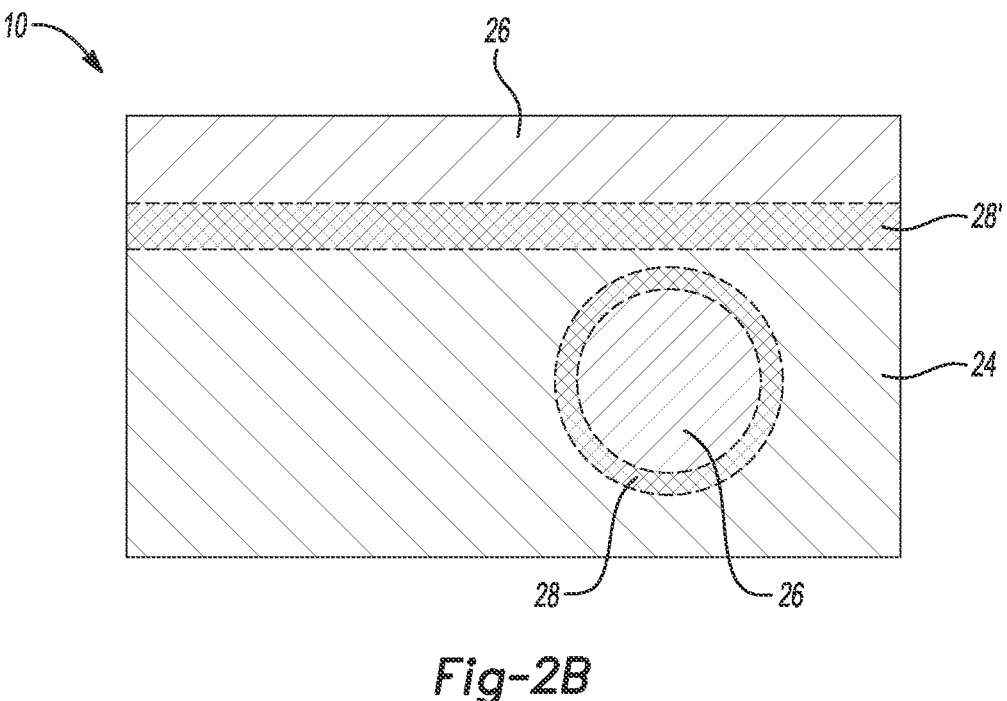
FIG. 2B is a cross-sectional view of the 3D object formed via the method shown in FIG. 1.

The alloying agent 20 (when used) and the diffusion barrier agent 22 may be deposited using the fluid ejectors 30', 30" as described herein in reference to FIG. 1, FIG. 2A, and FIG. 2B.

FIG. 4A depicts a top view of the patterned build material layer $L_1$. In the example shown in FIG. 3A and FIG. 4A, the diffusion barrier agent 22 is used to pattern the entire perimeter of the square/cube pattern that is generated with the alloying agent 22 or the mixed build material. This will form the diffusion barrier 28 shown in FIG. 3B and FIG. 4B. The diffusion barrier 28 that forms at the portion patterned with the diffusion barrier agent 22 includes the diffusion barrier component 23 intermingled with the metal-based build material composition, and may or may not include some of the alloyed composition. Whether the diffusion barrier 28 includes some of the alloyed composition depends upon the chemical potentials of the alloying element 21 and the diffusion barrier component 23, the thickness of the diffusion barrier pattern, and/or the concentration of the diffusion barrier component 23 in the diffusion barrier agent 22.

In this example method, a localized (focused) heat source 34 (e.g., a laser, an electron beam, a radiation source and micromirror(s) that direct the beam(s), etc.) of the 3D printer is scanned over the layer $L_1$ and is selectively activated to expose at least some of the patterned and non-patterned metal-based build material 12 in the layer $L_1$ to heat or at least some of the metal-based build material 12 and the mixed build material in the layer $L_1$ to heat. The selective activation of the localized heat source 34 is in accordance with the slice of the particular layer $L_1$ from the digital 3D object model (e.g., a computer model) that is being built. The radiation exposure from the localized heat source 34 is sufficient to raise the temperature of the exposed metal-based build material 12 (whether patterned or not or pre-mixed or not) to its melting point/range. As such, the exposed metal-based build material 12 melts and coalesces to form the 3D object layer 38 (a cross-section of which is shown in FIG. 3B and a top view of which is shown in FIG. 4B).

In the example shown in FIG. 3B and FIG. 4B, the portions respectively patterned with the alloying agent 20 and the diffusion barrier agent 22 are exposed to the heat from the localized heat source 34, and form, respectively, the site-specific alloyed portion 26 and the diffusion barrier 28. In this example, some of the non-patterned metal based build material 12 adjacent to the portions patterned with the diffusion barrier agent 22 are also exposed to the laser's radiation. This exposure forms non-alloyed section(s) 24.

Alternatively, the mixed build material and the metal-based build material 12 patterned with the diffusion barrier agent 22 are exposed to the heat from the localized heat source 34, and form, respectively, the site-specific alloyed portion 26 and the diffusion barrier 28. In this example, some of the metal based build material 12 (not pre-mixed with the alloying element 21) adjacent to the portions patterned with the diffusion barrier agent 22 are also exposed to the heat. This exposure forms non-alloyed section(s) 24.

In this example method, the localized heat source 34 may be any suitable device that generates an intense beam of coherent electromagnetic radiation. The localized heat source 34 may have a narrow bandwidth.

During heat exposure, the alloying element 21, e.g., in the portions patterned with the alloying agent 20 or in the predetermined portion containing the mixed build material, interacts or reacts with the metal-based build material 12 to form the alloyed composition. The interaction or reaction will depend upon the alloying element 21 and the metal-based build material 12.

Also during the radiation exposure, the diffusion barrier component 23 in the diffusion barrier 28 suppresses (e.g., reduces or prevents) the diffusion of the alloying element 21 from the site-specific alloyed section(s) 26 to the non-alloyed section(s) 24. This can form discrete site-specific alloyed section(s) 26 and non-alloyed section(s) 24, where the intermediate diffusion barrier(s) 28 includes a minimal amount or none of the alloyed composition. Alternatively, this can form an intermediate diffusion barrier(s) 28 that includes a gradient of the alloyed composition, in which the concentration of the alloyed composition is higher closer to the site-specific alloyed section(s) 26 and the concentration of the alloyed composition is lower closer to the non-alloyed section(s) 24.

As shown in FIG. 3C, this example method then involves spreading another layer $L_2$ of the metal-based build material 12 over the formed 3D object layer 38. Patterning with the agents 20, 22 and localized heat source scanning are repeated in accordance with the slice of the particular layer $L_2$ from the digital 3D object model. These processes may be repeated until the entire 3D object is built.

Alternatively, this example method may then involve spreading another layer $L_2$ of the metal-based build material 12 and the mixed build material over the formed 3D object layer 38. Patterning with the agent 22 and localized heat source scanning are repeated in accordance with the slice of the particular layer $L_2$ from the digital 3D object model. These processes may be repeated until the entire 3D object is built.

When build layer by layer, the 3D object may be built in any orientation with respect to the X-Y plane of the build area platform 16. For example, the 3D object can be printed from bottom to top in the Z-direction, or at an inverted orientation (e.g., from top to bottom) in the Z-direction. For another example, the 3D object can be printed at an angle or on its side. The orientation of the build can be selected in advance or even by the user at the time of printing, for example.

In this example method, no additional heating step(s) are performed because the 3D object is built layer by layer.

In some examples of either of the methods disclosed herein, the diffusion barrier agent 22 includes the diffusion barrier component 23; a percentage of the metal-based build material composition includes the same type of diffusion barrier component 23 that is present in the diffusion barrier agent 22; and the method further comprises adjusting an amount of the diffusion barrier agent 22 that is applied during patterning of the second portion based on the percentage of the diffusion barrier component in the metal-based build material composition. In these examples, because the metal-based build material composition includes the diffusion barrier component 23, the amount that is applied via the diffusion barrier agent 22 may be reduced (see FIG. 8 discussed in the Examples section below).

To further illustrate the present disclosure, examples are given herein. It is to be understood that these examples are provided for illustrative purposes and are not to be construed as limiting the scope of the present disclosure.

EXAMPLES

Example 1—Simulations

Several diffusion simulations were performed using CAL-PHAD software from Pandat.

Figure 5:
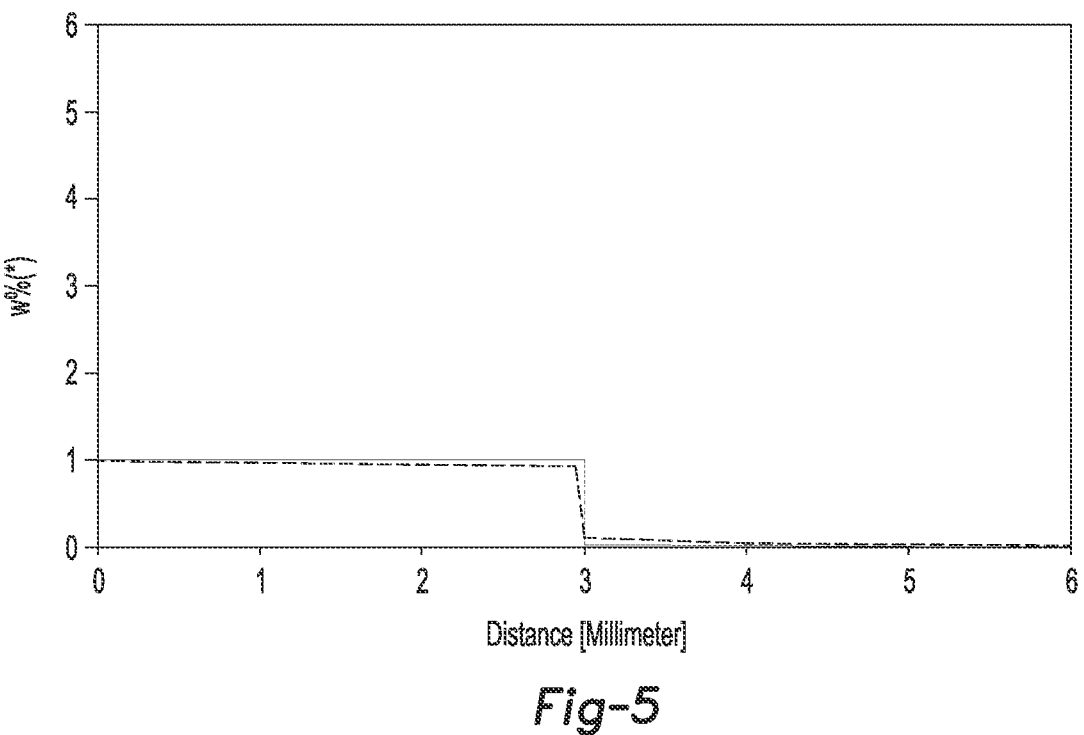
FIG. 5 is a graph depicting the simulation results of carbon diffusion (wt % carbon versus distance in mm) in different regions of a 3D printed object.

In the first simulation, a 3 mm wide carbon rich region (1 wt % carbon and 99 wt % iron (FCC, austenite)) was positioned adjacent to a 3 mm wide carbon lean and silicon rich region (0.02 wt % carbon, 5.78 wt % silicon, and 94.2% iron (FCC, austenite)), and the regions were exposed to 1200° C. for 1 hour. The carbon diffusion results from the simulation are shown in FIG. 5. In FIG. 5, the weight percentage of carbon is plotted against the distance (in mm) along the regions after the high temperature exposure. As depicted, about 0.12 wt % of carbon was present in the first mm of the carbon lean and silicon rich region. This simulation illustrated that silicon would be effective in substantially preventing carbon diffusion.

Figure 6:
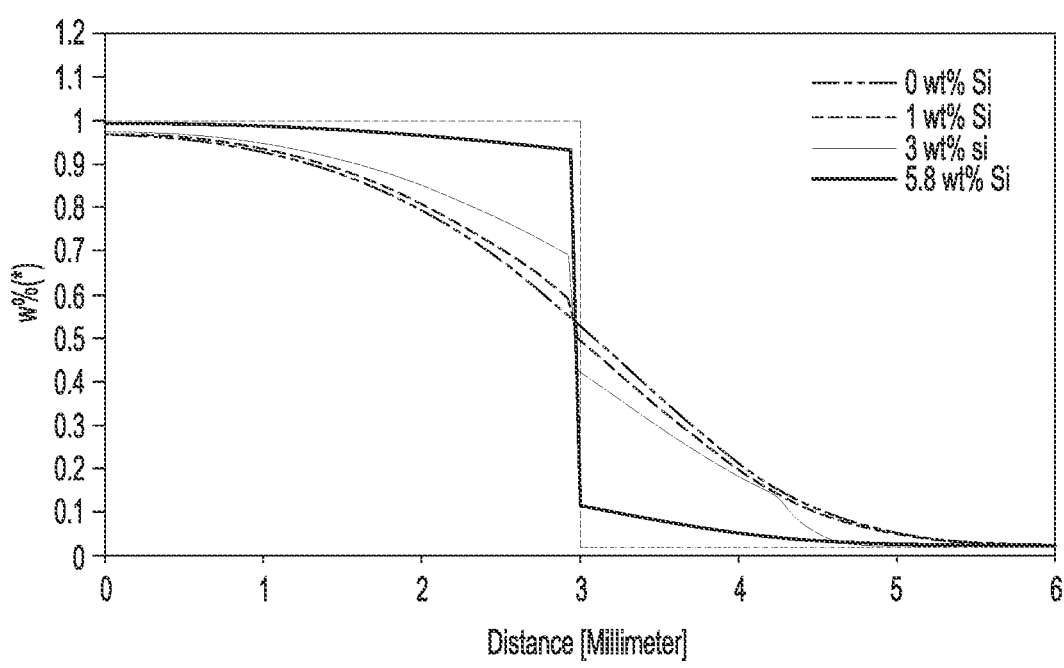
FIG. 6 a graph depicting the simulation results of carbon diffusion (wt % carbon versus distance in mm) in different regions of four different 3D printed objects.

In the second simulation, four different adjacent regions were compared. The first was a 3 mm wide carbon rich region (1 wt % carbon and 99 wt % iron (FCC, austenite)) positioned adjacent to a 3 mm wide carbon lean region (0.02 wt % carbon, 0 wt % silicon, and 98.98% iron (FCC, austenite)). The second was a 3 mm wide carbon rich region (1 wt % carbon and 99 wt % iron (FCC, austenite)) positioned adjacent to a 3 mm wide carbon lean and silicon rich region (0.02 wt % carbon, 1 wt % silicon, and 98.98% iron (FCC, austenite)). The third was a 3 mm wide carbon rich region (1 wt % carbon and 99 wt % iron (FCC, austenite)) positioned adjacent to a 3 mm wide carbon lean and silicon rich region (0.02 wt % carbon, 3 wt % silicon, and 96.98% iron (FCC, austenite)). The fourth was a 3 mm wide carbon rich region (1 wt % carbon and 99 wt % iron (FCC, austenite)) positioned adjacent to a 3 mm wide carbon lean and silicon rich region (0.02 wt % carbon, 5.8 wt % silicon, and 94.18% iron (FCC, austenite)). Each of the simulated regions was exposed to 1200° C. for 1 hour. The carbon diffusion results from the simulation are shown in FIG. 6. In FIG. 6, the weight percentage of carbon is plotted against the distance (in mm) along the regions after the high temperature exposure. As depicted, an increased silicon concentration reduced the chemical potential gradient so that carbon diffusion was suppressed.

Figures 7, 8:
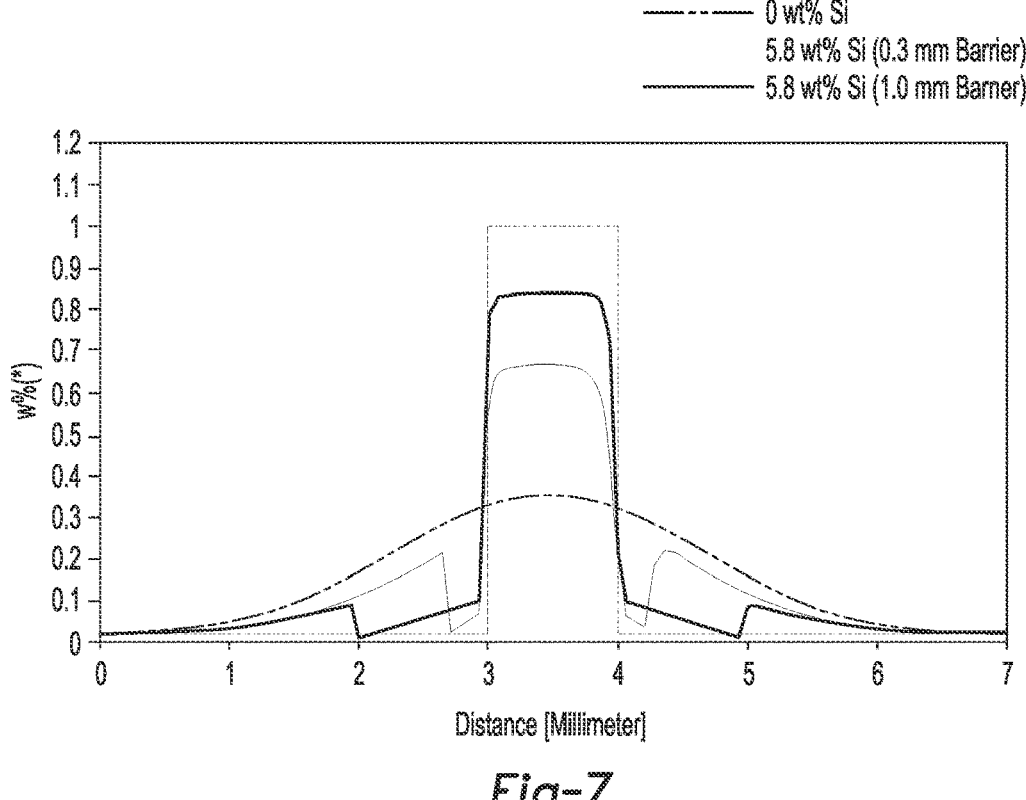
FIG. 7 a graph depicting the simulation results of carbon diffusion (wt % carbon versus distance in mm) in different regions of a 3D printed object including two different diffusion barriers.
FIG. 8 a graph depicting the simulation results of carbon diffusion (wt % carbon versus distance in mm) in different regions of a 3D printed object including a diffusion barrier component in the regions.

In the third simulation, two diffusion barriers with different thicknesses were compared. The first diffusion barrier included 0.3 mm thick carbon lean and silicon rich regions (0.02 wt % carbon, 0.02 wt % silicon, and 99.96% iron (FCC, austenite), which were respectively positioned between a central carbon rich (1 wt % carbon and 99 wt % iron (FCC, austenite)) region and flanking carbon lean regions (0.2 wt % carbon and 99.98 wt % iron (FCC, austenite)). The second diffusion barrier included 1 mm thick carbon lean and silicon rich regions (0.02 wt % carbon, 0.02 wt % silicon, and 99.96% iron (FCC, austenite), which were respectively positioned between a central carbon rich (1 wt % carbon and 99 wt % iron (FCC, austenite)) region and flanking carbon lean regions (0.2 wt % carbon and 99.98 wt % iron (FCC, austenite)). The regions were exposed to 1,200° C. for 1 hour. The carbon diffusion results from the simulation are shown in FIG. 7. In FIG. 7, the weight percentage of carbon is plotted against the distance (in mm) along the regions after the high temperature exposure. As depicted, increasing the thickness of the diffusion barrier can reduce diffusion and preserve more carbon in the carbon rich region.

In the fourth simulation, four different examples were compared.

In the fourth simulation, the first three examples compared the effect of different amounts (0 wt %, 6.5 wt %, or 7.5 wt %) of silicon to the base material without including a diffusion barrier between the carbon rich and carbon lean regions. The first example included a carbon rich (1 wt % carbon, 0% silicon and 99 wt % iron (FCC, austenite)) region positioned between two carbon lean regions (0.02 wt % carbon, 0% silicon and 99.08 wt % iron (FCC, austenite)). The second example included a carbon and silicon rich (1 wt % carbon, 6.5% silicon and 92.5 wt % iron (FCC, austenite)) region positioned between two carbon lean and silicon rich regions (0.02 wt % carbon, 6.5% silicon and 93.48 wt % iron (FCC, austenite)). The third example also included a carbon and silicon rich (1 wt % carbon, 7.5% silicon and 91.5 wt % iron (FCC, austenite)) region positioned between two carbon lean and silicon rich regions (0.02 wt % carbon, 7.5% silicon and 93.48 wt % iron (FCC, austenite)).

In the fourth simulation, the fourth example added a diffusion barrier to the second example. As such, the fourth example included a carbon and silicon rich (1 wt % carbon, 6.5% silicon and 92.5 wt % iron (FCC, austenite)) region positioned between two carbon lean and silicon rich regions (0.02 wt % carbon, 6.5% silicon and 93.48 wt % iron (FCC, austenite)), and a diffusion barrier between the carbon and silicon rich region and each of the carbon lean and silicon rich regions. The diffusion barriers were 0.3 mm carbon lean and silicon rich regions (0.02 wt % carbon, 7.5 wt % silicon (6.5 wt % of which was from the base material), and 92.48% iron (FCC, austenite)).

In this simulation, all of the regions of all of the examples were exposed to 1,200° C. for 1 hour. The carbon diffusion results from the simulation are shown in FIG. 8. In FIG. 8, the higher bulk concentration of silicon resulted in less carbon diffusion. Thus, when the diffusion barrier element is added into the base build material, a lower concentration of the diffusion barrier element introduced via the diffusion barrier agent can be effective in achieving the desired diffusion reduction.

Example 2

One example and one comparative object were generated with loose powder sintering. For both the example and comparative objects, low alloy steel powders, namely St1.01444 and AISI 8620, were used as the build material. Two different powders were used to clearly distinguish the interface originally present when layered in the cylindrical crucibles.

For the example object, a mixture of the AISI 8620 steel build material and carbon black powder (1 wt %) was added to a cylindrical crucible to generate a carbon rich portion. A mixture of the St1.01444 steel build material and silicon particles (1 wt %) was applied on the carbon rich portion to generate a diffusion barrier portion. For the example object, carbon was the alloying element and silicon was the diffusion barrier component.

For the comparative object, a mixture of the AISI 8620 steel build material and carbon black powder (1 wt %) was added to a cylindrical crucible to generate a carbon rich portion. The St1.01444 steel build material (without added carbon or silicon) was applied on the carbon rich portion.

The layered powders for the example object and the layered powders for the comparative object were exposed to the same sintering profile, which included i) increasing the temperature at a rate of 5° C. per minute until 720° C. was reached, ii) maintaining the 720° C. temperature for 8 hours, iii) increasing the temperature to 1,200° C., iv) maintaining the 1,200° C. for 30 minutes, and v) naturally cooling in vacuum furnace.

Optical microscopy images were taken of i) a cross-section of the example object at the interface between the coalesced carbon rich portion and the coalesced silicon rich portion, and ii) a cross-section of the comparative object at the interface between the coalesced carbon rich portion and the coalesced steel build material portion. The example object is shown in FIG. 9A and the comparative object is shown in FIG. 9B. In FIG. 9A, the darker portions represent the alloyed composition and the lighter (brighter) portions represent the diffusion barrier containing the coalesced steel build material and silicon particles. In FIG. 9B, the darker portions represent the alloyed composition and the lighter (brighter) portions represent the coalesced steel build material. The distance of the carbon diffusion from the carbon rich portion in the example object and from the carbon rich portion in the comparative object is illustrated by the arrows in each of FIGS. 9A and 9B. Clearly, the presence of the silicon particles in the example object interrupted and suppressed the carbon diffusion in multiple locations along the interface between the carbon rich portion and the silicon rich portion. Without the silicon particles, more carbon diffusion took place.

Figure 10A:
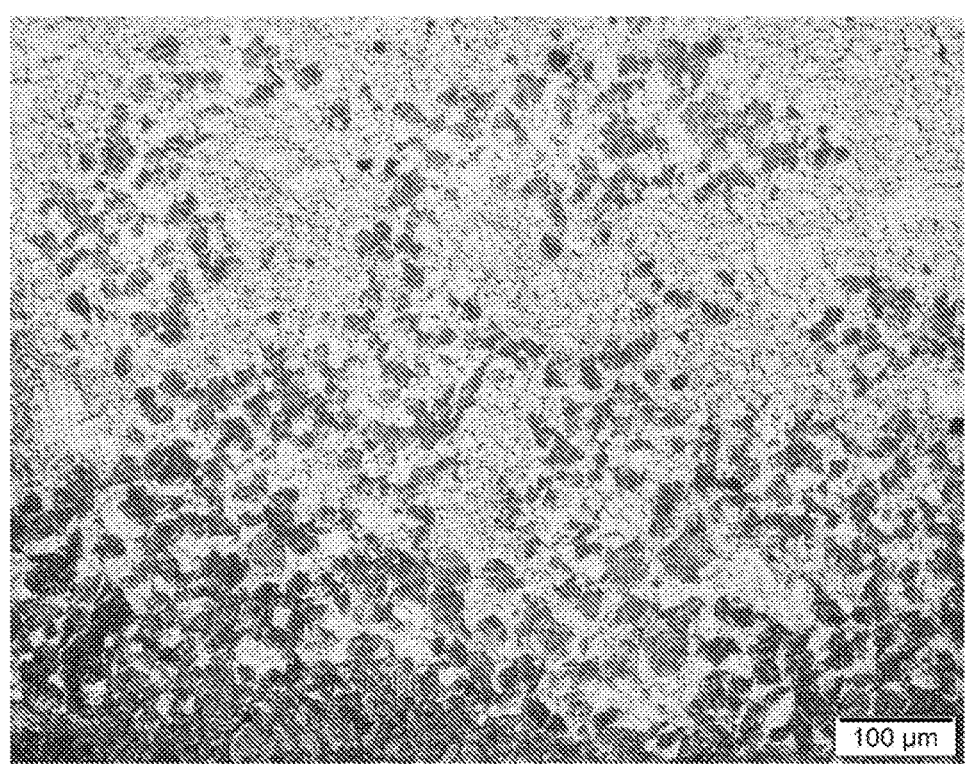
FIG. 10A is a higher resolution image of a portion of the example object.
Figure 10B:
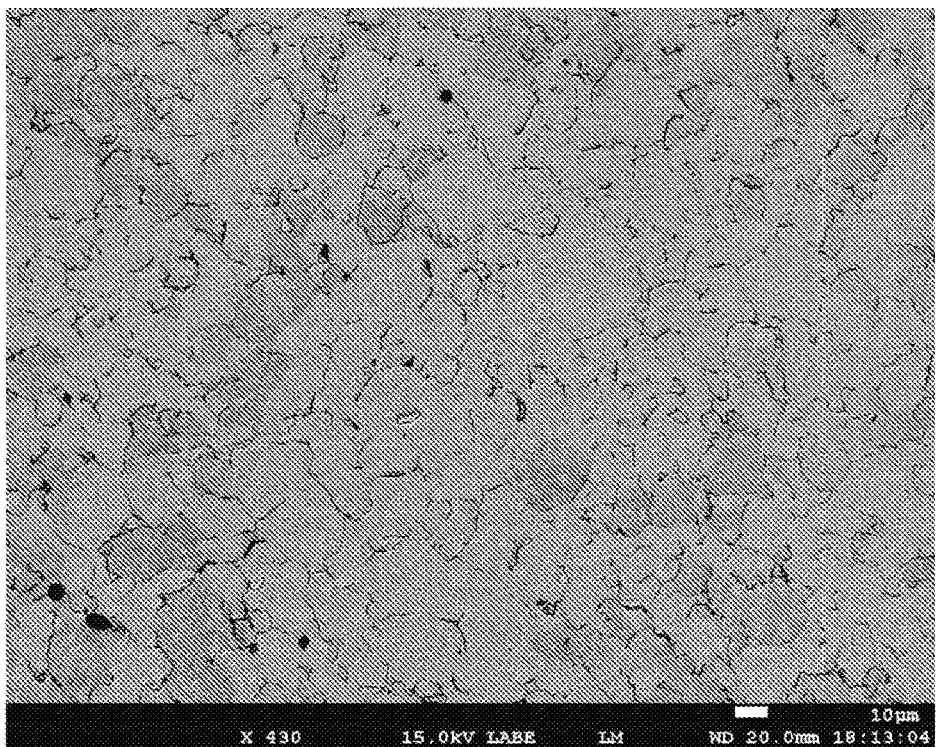
FIG. 10B is a scanning electron microscope image of the image portion of the example object of FIG. 10A.

FIG. 10A is an enlarged image of the portion outlined in FIG. 9A, and FIG. 10B is a scanning electron microscope image of the portion of FIG. 10A. FIG. 10B clearly illustrates the effect the silicon has on carbon diffusion, because the diffused carbon is randomly dispersed and scattered throughout the silicon rich region. Energy dispersive X-ray spectroscopy (EDS) spectrums (not reproduced herein) for the silicon and carbon validated the optical and scanning electron microscope images, that in the silicon rich regions, carbon was depleted.

It is to be understood that the ranges provided herein include the stated range and any value or sub-range within the stated range, as if such values or sub-ranges were explicitly recited. For example, from about 1 wt % to about 50 wt % should be interpreted to include not only the explicitly recited limits of from about 1 wt % to about 50 wt %, but also to include individual values, such as about 1.85 wt %, about 22.9 wt %, about 45.2 wt %, etc., and sub-ranges, such as from about 10 wt % to about 50 wt %, from about 1 wt % to about 40 wt %, from about 2.75 wt % to about 3.75 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for generating a site-specific alloyed section of a three-dimensional (3D) object during three-dimensional printing, the method comprising:

based on a digital 3D object model of the 3D object, patterning individual layers of a metal-based build material with a binder agent to form an intermediate structure;

based on the digital 3D object model, patterning a first portion of at least one of the individual layers with an alloying agent to form a pattern of the site-specific alloyed section;

based on the digital 3D object model, patterning a second portion of at least one of the individual layers with a diffusion barrier agent to form a perimeter pattern at an edge of at least a portion of the pattern of the site-specific alloyed section; and exposing the intermediate structure to a heat treatment to form the 3D object.

2. The method as defined in claim 1, wherein the diffusion barrier agent includes a diffusion barrier component that is to restrict diffusion of an alloying element that is contained in the alloying agent.

3. The method as defined in claim 2, wherein the diffusion barrier component is selected from the group consisting of silicon, nickel, copper, chromium, vanadium, titanium, tantalum, carbon, aluminum, tantalum nitride, titanium nitride, titanium dioxide, titanium carbide, tungsten-titanium, yttria stabilized zirconia, a metal silicide, an amorphous alloy, hexagonal boron nitride, molybdenum disulfide, and ruthenium-titanium dioxide.

4. The method as defined in claim 2, wherein a concentration of the diffusion barrier component in the diffusion barrier agent ranges from about 0.1 wt % to about 10 wt %.

5. The method as defined in claim 2, wherein one of:

i) the metal-based build material is an iron-based steel; the alloying element in the alloying agent is carbon; and the diffusion barrier component is selected from the group consisting of silicon, nickel, copper, and tantalum; or ii) the metal-based build material is an aluminum-based build material;

the alloying element in the alloying agent is silicon; and the diffusion barrier component is a metal silicide selected from the group consisting of $Ni_2Si$, $NiSi$, $Ni_5Si_2$, $Ni_3Si$, $Co_2Si$, $CoSi$, $CoSi_2$, $PtSi$, $Pd_2Si$, $TiSi_2$, $CoSi_3$, $MoSi$, $TaSi_2$, $WSi_2$; or iii) the metal-based build material is a copper-based build material;

the alloying element in the alloying agent is silicon; and the diffusion barrier component is selected from the group consisting of tantalum, tantalum nitride, and titanium-tungsten; or iv) the metal-based build material is an iron-chromium alloy;

the alloying element in the alloying agent is palladium; and the diffusion barrier component is yttria stabilized zirconia; or v) the metal-based build material is an aluminum-based build material;

the alloying element in the alloying agent is silicon; and the diffusion barrier component is selected from the group consisting of chromium, vanadium, titanium, tantalum nitride, titanium nitride, titanium carbide, titanium-tungsten, and an amorphous alloy; or vi) the metal-based build material is an iron-based steel; the alloying element in the alloying agent is nickel; and the diffusion barrier component is carbon; or vii) the metal-based build material is selected from the group consisting of martensitic stainless steel, austenitic stainless steel, and carbon-manganese steel;

the alloying element in the alloying agent is copper; and the diffusion barrier component is selected from the group consisting of tantalum, tantalum nitride, titanium nitride, aluminum, hexagonal boron nitride, molybdenum disulfide, and ruthenium-titanium dioxide.

6. The method as defined in claim 1, wherein the diffusion barrier agent is selectively applied so that the perimeter pattern is defined around an entire pattern of the site-specific alloyed section.

7. The method as defined in claim 1, wherein the heat treatment involves:

exposure to a de-binding temperature for a first predetermined time; and then exposure to a sintering temperature for a second predetermined time.

8. The method as defined in claim 1, wherein:

the diffusion barrier agent includes a diffusion barrier component;

a percentage of the metal-based build material is a same type of diffusion barrier component that is present in the diffusion barrier agent; and the method further comprises adjusting an amount of the diffusion barrier agent that is applied during patterning of the second portion based on the percentage of the diffusion barrier component in the metal-based build material.

9. A method for generating a site-specific alloyed section of a three-dimensional (3D) object during three-dimensional printing, the method comprising:

applying a metal-based build material to form a build material layer, wherein a predetermined portion of the build material layer includes an alloying element;

based on a digital 3D object model of the 3D object, patterning a portion of the build material layer with a diffusion barrier agent to form a perimeter pattern at an edge of at least part of the predetermined portion; and using a localized heat source to scan the build material layer based on the digital 3D object model, thereby forming a layer of the 3D object.

10. The method as defined in claim 9, wherein the diffusion barrier agent includes a diffusion barrier component that is to restrict diffusion of the alloying element out of the predetermined portion.

11. The method as defined in claim 10, wherein one of:

i) the metal-based build material is an iron-based steel;

the alloying element is carbon; and the diffusion barrier component is selected from the group consisting of silicon, nickel, copper, and tantalum; or ii) the metal-based build material is an aluminum-based build material;

the alloying element is silicon; and the diffusion barrier component is a metal silicide selected from the group consisting of $M_2Si$, $MSi$, $MSi_2$, $Ni_2Si$, $NiSi$, $Ni_5Si_2$, $Ni_3Si$, $Co_2Si$, $CoSi$, $CoSi_2$, $PtSi$, $Pd_2Si$, $TiSi_2$, $CoSi_3$, $MoSi$, $TaSi_2$, $WSi_2$; or iii) the metal-based build material is a copper-based build material;

the alloying element is silicon; and the diffusion barrier component is selected from the group consisting of tantalum, tantalum nitride, and titanium-tungsten; or iv) the metal-based build material is an iron-chromium alloy;

the alloying element is palladium; and the diffusion barrier component is yttria stabilized zirconia; or v) the metal-based build material is an aluminum-based build material;

the alloying element is silicon; and the diffusion barrier component is selected from the group consisting of chromium, vanadium, titanium, tantalum nitride, titanium nitride, titanium carbide, titanium-tungsten, and an amorphous alloy; or vi) the metal-based build material is an iron-based steel;

the alloying element is nickel; and the diffusion barrier component is carbon; or vii) the metal-based build material is selected from the group consisting of martensitic stainless steel, austenitic stainless steel, and carbon-manganese steel;

the alloying element is copper; and the diffusion barrier component is selected from the group consisting of tantalum, tantalum nitride, titanium nitride, aluminum, hexagonal boron nitride, molybdenum disulfide, and ruthenium-titanium dioxide.

12. The method as defined in claim 9, further comprising generating the predetermined portion by patterning a section of the build material layer with an alloying agent that contains the alloying element.

13. The method as defined in claim 9, further comprising generating the predetermined portion by:

mixing the alloying element with some of the metal-based build material to generate a mixed build material; and applying the mixed build material instead of the metal-based build material at a predetermined location for the predetermined portion.

14. The method as defined in claim 9, wherein the metal-based build material includes a percentage of a diffusion barrier component present in the diffusion barrier agent, and wherein the method further comprises adjusting an amount of the diffusion barrier agent that is applied during patterning of the portion based on the percentage of the diffusion barrier component in the metal-based build material.

* * * * *